(12) United States Patent
Claussen et al.

(10) Patent No.: US 8,696,296 B2
(45) Date of Patent: Apr. 15, 2014

(54) SEED TENDER

(75) Inventors: Steven W. Claussen, Glenwood, MN (US); Jereme J. Ascheman, Benson, MN (US)

(73) Assignee: Willmar Fabrication, LLC, Willmar, MN (US)

( * ) Notice: Subject to any disclaimer, the term of this patent is extended or adjusted under 35 U.S.C. 154(b) by 227 days.

(21) Appl. No.: 13/097,974

(22) Filed: Apr. 29, 2011

(65) Prior Publication Data

US 2012/0275888 A1 Nov. 1, 2012

(51) Int. Cl.
*B60P 1/00* (2006.01)

(52) U.S. Cl.
USPC ........... 414/503; 414/505; 414/528; 414/504; 198/317; 198/318

(58) Field of Classification Search
USPC .............. 198/312, 315, 316.1, 317, 318; 414/501, 502, 503, 504, 505, 523, 526, 414/744.5
See application file for complete search history.

(56) References Cited

U.S. PATENT DOCUMENTS

| 5,718,556 | A * | 2/1998 | Forsyth .................. 414/503 |
| 5,785,481 | A | 7/1998 | Ockels |
| 5,888,044 | A | 3/1999 | Baskerville |
| 6,120,233 | A | 9/2000 | Adam |
| 7,267,519 | B2 | 9/2007 | Cresswell et al. |
| 7,500,817 | B2 | 3/2009 | Furrer et al. |
| 2007/0079739 | A1 | 4/2007 | Meyer |
| 2007/0083293 | A1 | 4/2007 | Applegate et al. |
| 2008/0210145 | A1 | 9/2008 | Petersen et al. |
| 2009/0156278 | A1 | 6/2009 | Cooksey et al. |
| 2011/0035055 | A1 | 2/2011 | Applegate et al. |
| 2013/0134012 | A1 * | 5/2013 | Borkgren ............. 198/315 |
| 2013/0134013 | A1 * | 5/2013 | Borkgren ............. 198/318 |
| 2013/0149090 | A1 * | 6/2013 | Friggstad et al. .......... 414/523 |
| 2013/0149091 | A1 * | 6/2013 | Friggstad et al. .......... 414/523 |

* cited by examiner

*Primary Examiner* — Saul Rodriguez
*Assistant Examiner* — Brendan Tighe
(74) *Attorney, Agent, or Firm* — Mueting, Raasch & Gebhardt, P.A.

(57) ABSTRACT

Seed tender apparatus for holding one or more seed containers and including an inclined conveyor apparatus pivotable between a stowed configuration and a discharged configuration.

20 Claims, 21 Drawing Sheets

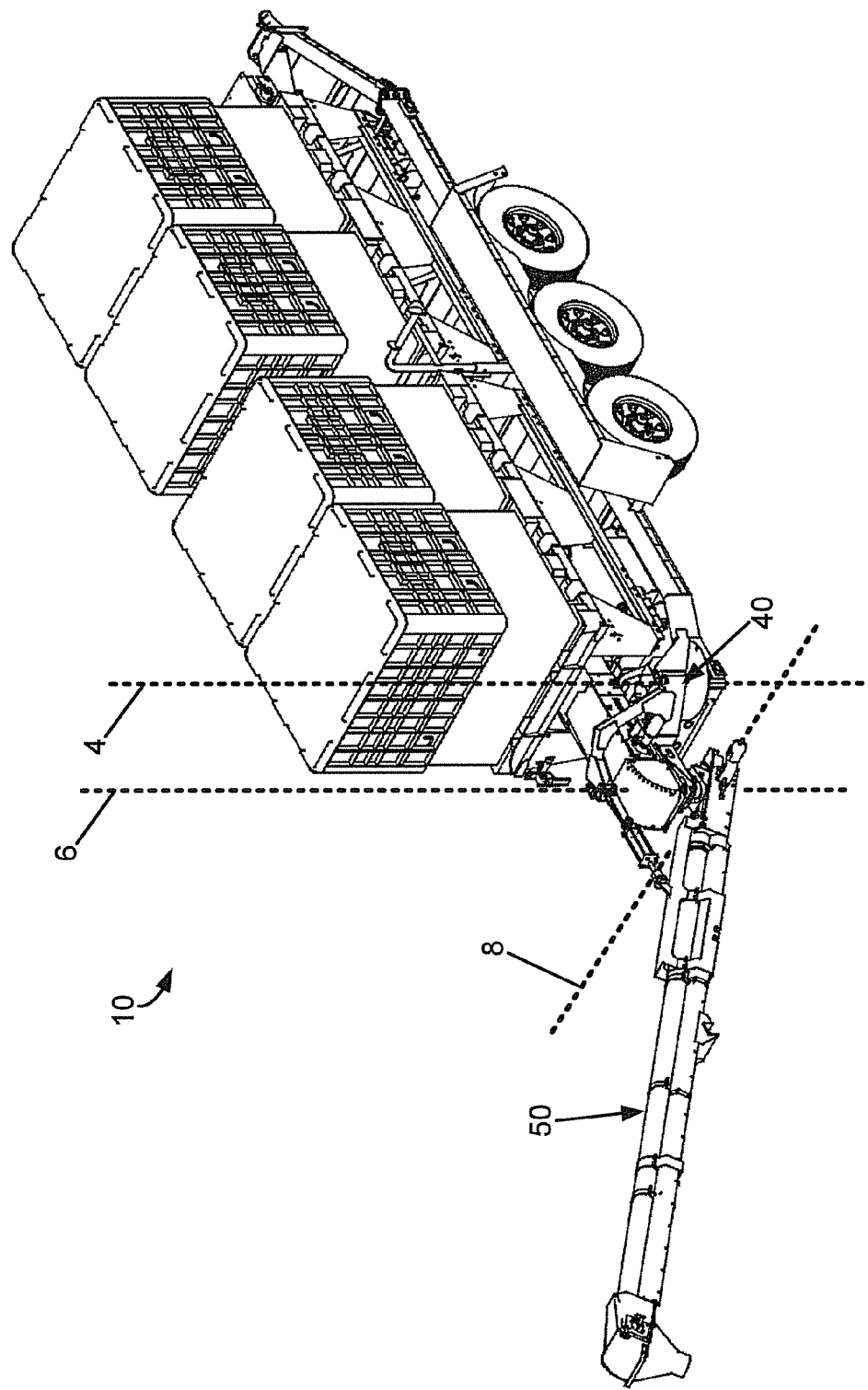

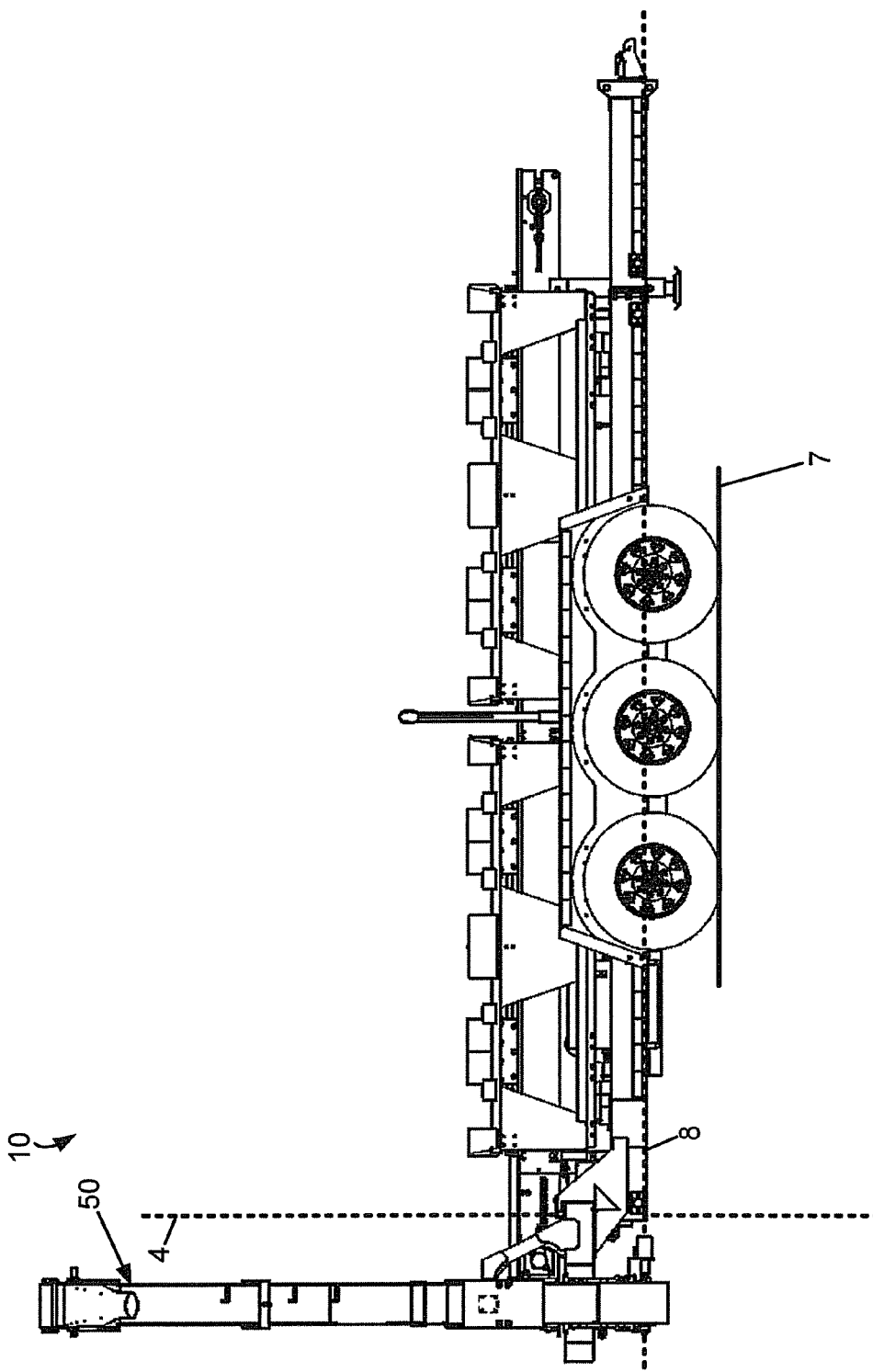

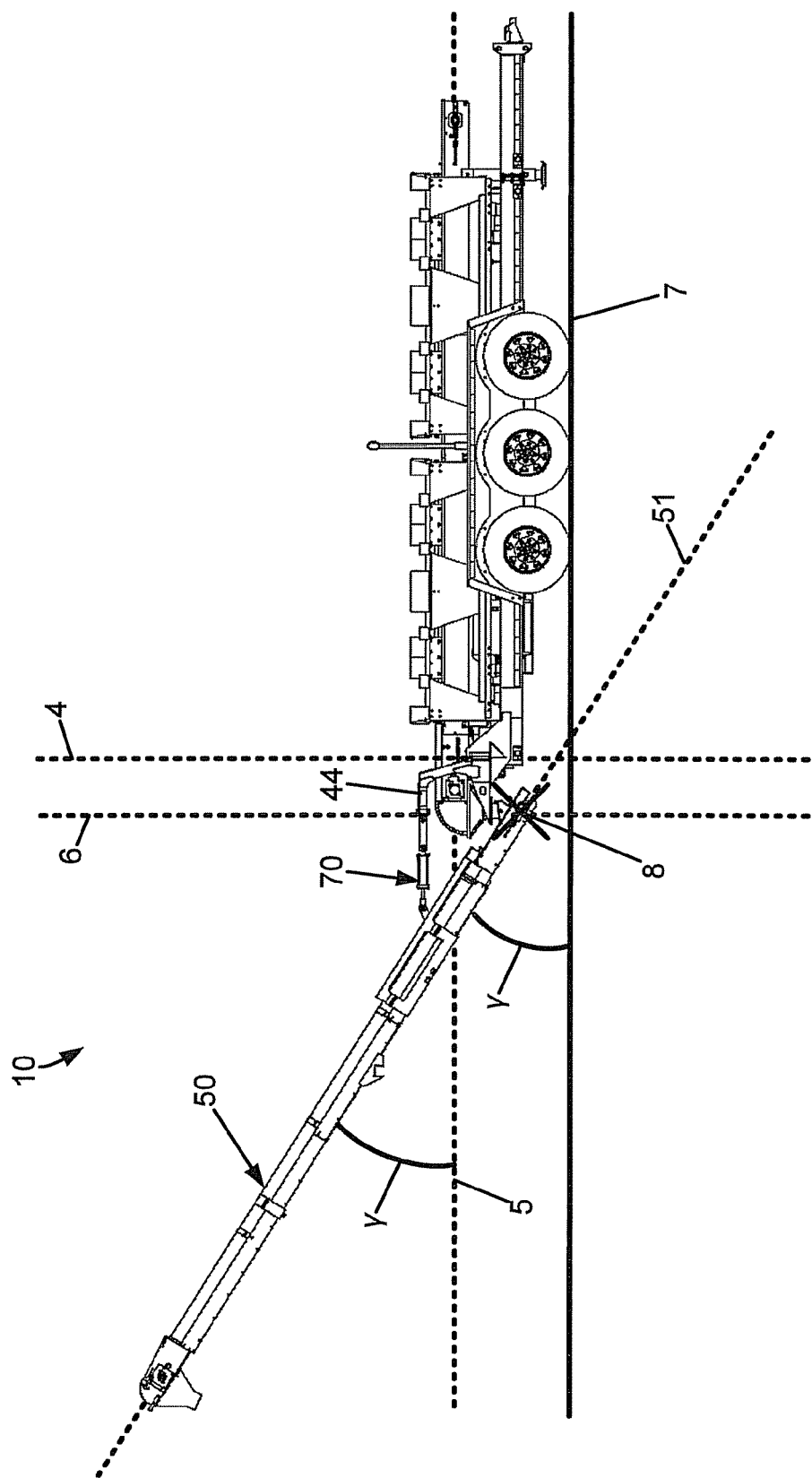

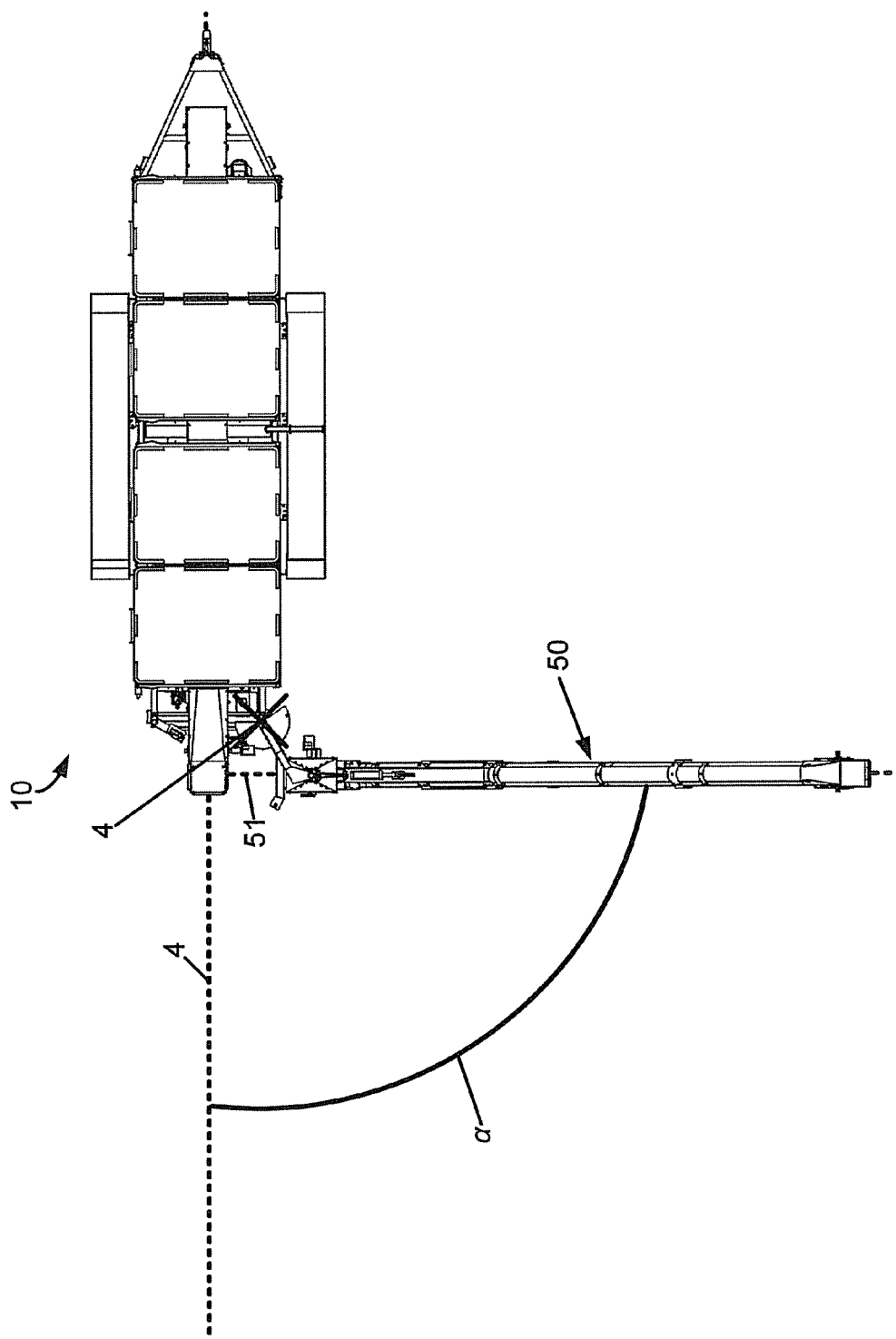

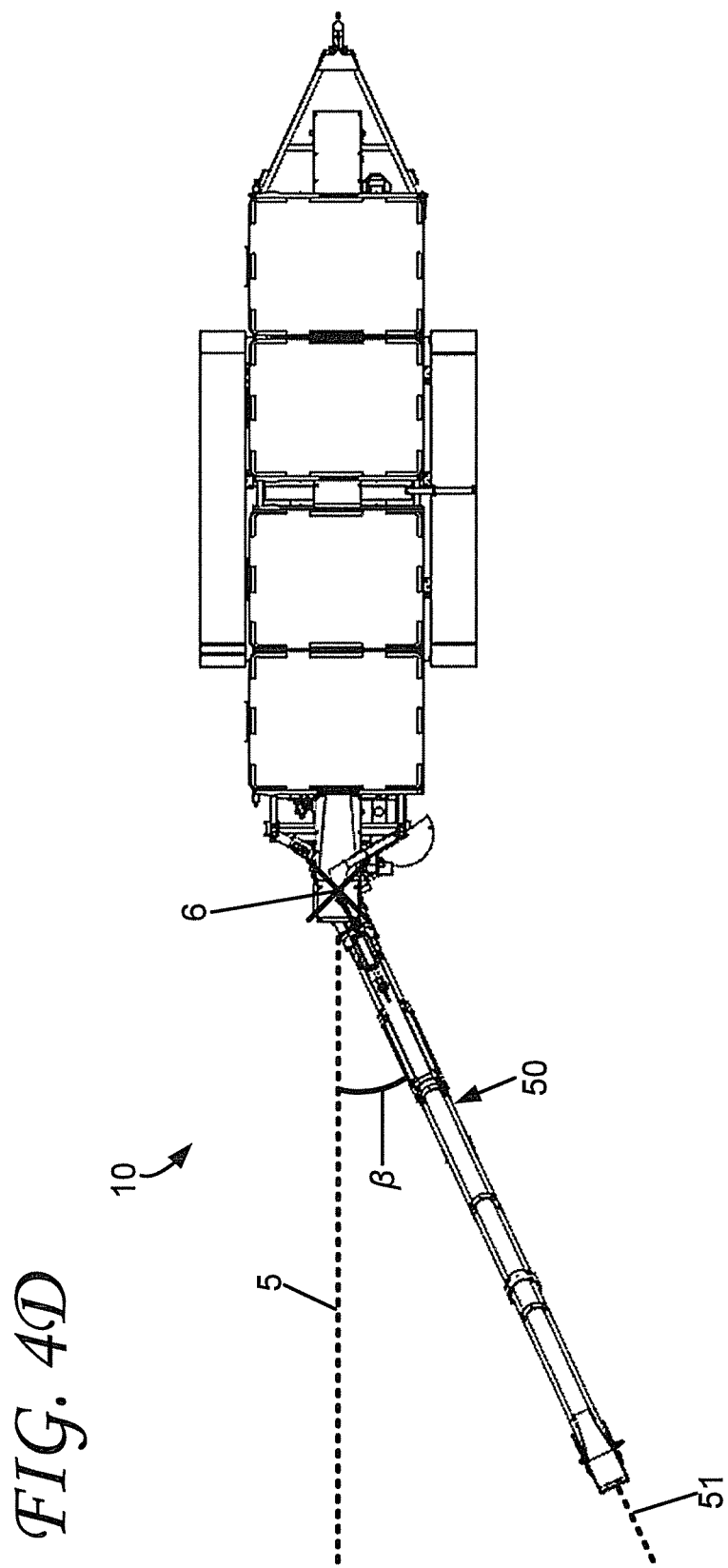

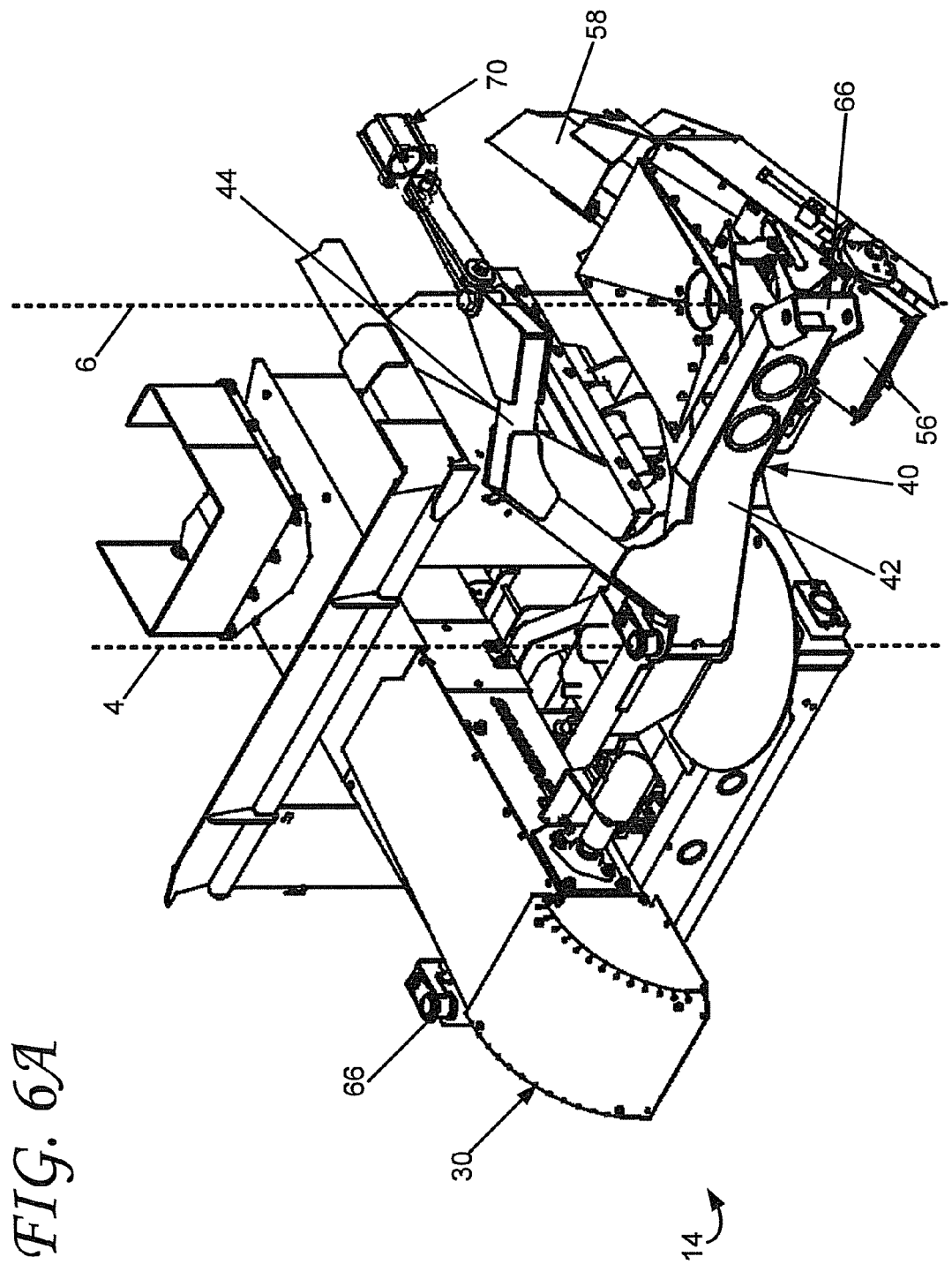

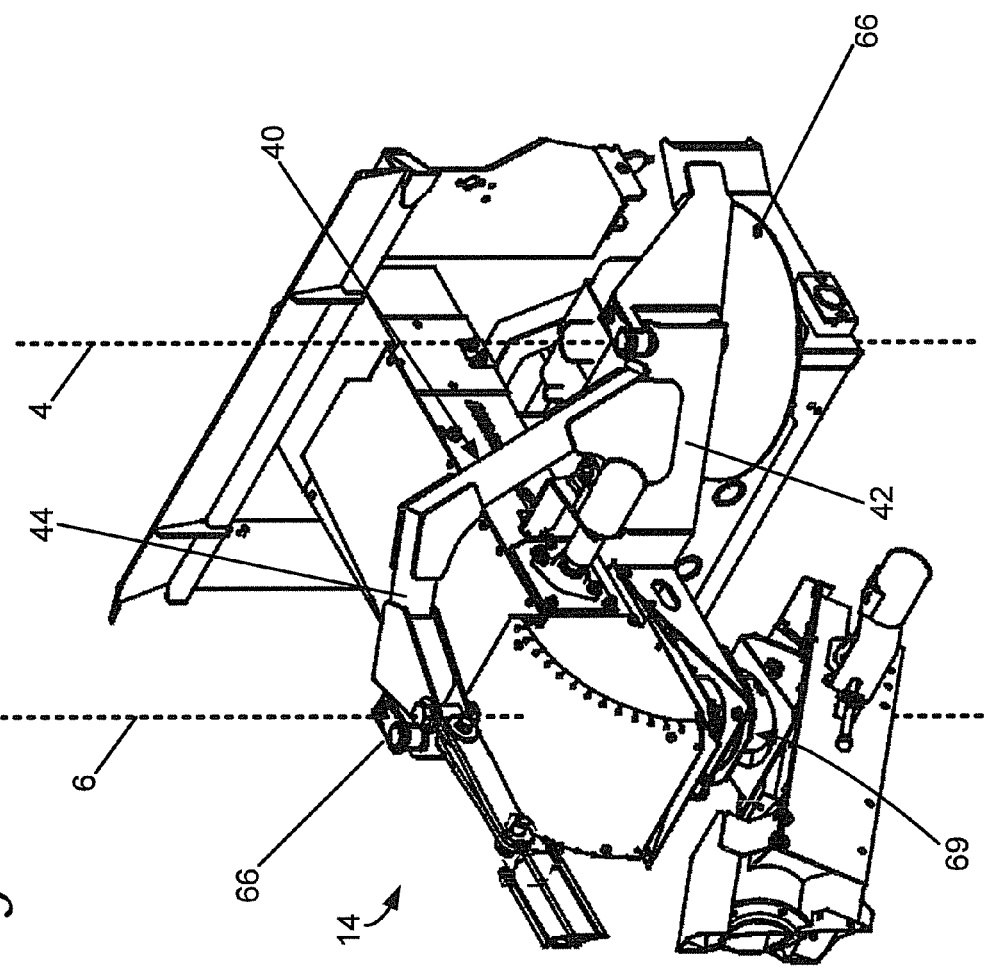

SEED TENDER

The disclosure herein relates to a seed tender for use in holding one or more seed containers and discharging seed from the one or more seed containers.

Seed used in the agricultural industry is often stored and transported using various types of seed containers and vehicles. For example, seed may be removed from vehicles and loaded into various agricultural equipment such as seed tenders, etc. Some seed tenders may be configured to receive and hold the seed itself or the seed containers, and to distribute the seed into other agricultural equipment such as planters.

SUMMARY

The present disclosure describes an exemplary seed tender including an inclined conveyor system that is pivotally movable about a first pivot axis between a stowed configuration and a discharge configuration, and is further pivotally movable about a second pivot axis when in the discharge configuration. In the stowed configuration, the inclined conveyor apparatus may be positioned such that the tender may be arranged for transport and/or storage. In the discharge configuration, the inclined conveyor apparatus may be positioned to discharge seed to agricultural equipment such as a planter.

Further, in one or more embodiments, the inclined conveyor system of the exemplary seed tender may be pivotally movable about the second pivot axis to a plurality of positions so as to be able to discharge seed in various directions from the seed tender, e.g., to accommodate delivery or distribution of seed into agricultural equipment located in various positions with respect to the seed tender. Still further, the inclined conveyor apparatus may be tiltable, or pivotally movable about a third pivot axis perpendicular to the first and second pivot axes, such that a distal end of the conveyor apparatus may be raised or lowered (e.g., changing the angle of the conveyor relative to the ground), e.g., to accommodate delivery or distribution of seed into agricultural apparatus having various heights.

An exemplary seed tender may define a front side, a rear side, a left side, and a right side, and may include a frame, a discharge apparatus, and an inclined conveyor apparatus. The frame may extend from the front side to the rear side of the tender along a frame axis and may be configured to hold one or more seed containers. The discharge apparatus may be located proximate the rear side of the frame and may be configured to move seed from one or more seed containers and to discharge the seed.

The inclined conveyor apparatus of the exemplary seed tender may extend from a proximal end to a distal end along a conveyor axis. The inclined conveyor apparatus may be configured to receive seed proximate the proximal end via the discharge apparatus, to move seed proximate the proximal end to proximate the distal end, and to discharge seed proximate the distal end. Further, the inclined conveyor apparatus may be pivotally coupled to the frame proximate the proximal end of the inclined conveyor apparatus about a first pivot axis.

The inclined conveyor apparatus of the exemplary seed tender may be configured to pivotally move about the first pivot axis between at least a stowed configuration and a discharge configuration (e.g., the inclined conveyor apparatus may be pivotally movable 180 degrees about the first pivot axis from the stowed configuration to the discharge configuration). For example, the proximal end of the inclined conveyor apparatus may be located proximate the discharge apparatus to receive seed from the discharge apparatus when in the discharge configuration and wherein the inclined conveyor apparatus may be pivotally movable about a second pivot axis when in the discharge configuration. Further, for example, each of the distal end and the proximal end of the inclined conveyor apparatus may be both located proximate a plane defined by one of the right side and the left side of the tender when in the stowed configuration.

In at least one exemplary seed tender, the first pivot axis may be closer to the right side than the left side of the tender and each of the distal end and the proximal end of the inclined conveyor apparatus may be both located proximate a plane defined by the right side of the tender when in the stowed position. In at least one exemplary seed tender, the inclined conveyor apparatus may extend from the proximal end to the distal end along a conveyor axis, and the conveyor axis of the conveyor apparatus may be parallel a plane defined by one of the right side and the left side of the tender when in the stowed configuration.

In at least one exemplary seed tender, the inclined conveyor apparatus may include a proximal portion and a distal portion pivotally coupled to the proximal portion about a third pivot axis. The third pivot axis may be perpendicular to the first pivot axis and the distal portion of the inclined conveyor apparatus may be pivotally movable about the third pivot axis to at least raise and lower the distal end of the conveyor apparatus. For example, the distal portion of the inclined conveyor apparatus may be configured to pivot about the third pivot axis such that a conveyor axis extending through the distal portion may be pivotally movable 45 degrees relative to the frame axis. Further, the proximal portion and the distal portion of the inclined conveyor apparatus may be each individually pivotally coupled to the frame. Still further, the exemplary seed tender may further include actuation apparatus coupled to the distal portion of the inclined conveyor apparatus, and the actuation apparatus may be configured to pivot the distal portion of the inclined conveyor apparatus about the third pivot axis.

In at least one exemplary seed tender, the seed tender may include a horizontal conveyor apparatus configured to move the seed from the one or more containers to the discharge apparatus and/or locking apparatus configured to lock the inclined conveyor apparatus in the discharge configuration and/or stowed configuration.

Another exemplary seed tender may include a frame, a discharge apparatus, a pivot member, and an inclined conveyor apparatus. The frame may extend from the front side to the rear side of the tender along a frame axis and may be configured to hold one or more seed containers. The discharge apparatus may be located proximate the rear side to receive seed from one or more seed containers and to discharge the seed. The pivot member may be pivotally coupled to the frame proximate the rear side of the tender about a first pivot axis.

The inclined conveyor apparatus of the exemplary seed tender may extend from a proximal end to a distal end and may be configured to receive seed proximate the proximal end via the discharge apparatus, to move seed proximate the proximal end to proximate the distal end, and to discharge seed proximate the distal end. Further, the inclined conveyor apparatus may be pivotally coupled to the pivot member proximate the proximal end of the inclined conveyor apparatus about a second pivot axis.

The pivot member and the inclined conveyor apparatus may be configured to pivotally move together about the first pivot axis between at least a stowed configuration and a discharge configuration (e.g., the pivot member and the inclined conveyor apparatus may be pivotally movable 180 degrees about the first pivot axis from the stowed configuration to the discharge configuration). For example, the proximal end of the inclined conveyor apparatus may be located proximate the discharge apparatus to receive seed from the discharge apparatus when in the discharge configuration and the inclined conveyor apparatus may be pivotally movable about the second pivot axis when in the discharge configuration. Further, for example, the inclined conveyor apparatus may be adjacent a plane defined by one of the right side and the left side of the tender when in the stowed configuration.

In at least one exemplary seed tender, the pivot member may include a first portion pivotally coupled to a proximal portion of the inclined conveyor apparatus and a second portion pivotally coupled to a distal portion of the inclined conveyor apparatus. Further, the seed tender may include actuation apparatus coupled between the second portion of the pivot member and the distal portion of the inclined conveyor apparatus, and the actuation apparatus may be configured to pivot the distal portion of the inclined conveyor apparatus about the third pivot axis. Still further, the pivot member may extend from a first end to a second end, and the first end of the pivot member may be pivotally coupled to the frame and the second end of the pivot member may be pivotally coupled to the inclined conveyor apparatus.

The above summary is not intended to describe each embodiment or every implementation of the present disclosure. A more complete understanding will become apparent and appreciated by referring to the following detailed description and claims taken in conjunction with the accompanying drawings.

BRIEF DESCRIPTION OF THE DRAWINGS

FIG. 2C is a perspective view of the exemplary seed tender of FIGS. 2A-2B including the inclined conveyor apparatus configured in a discharge configuration.

FIGS. 3A, 3B, and 3C are right side views of the exemplary seed tender of FIGS. 2A, 2B, and 2C, respectively.

FIGS. 4A, 4B, 4C, and 4D are top views of the exemplary seed tender of FIGS. 2A, 2B, 2C, and 2D respectively.

FIGS. 6A and 6B are close-up, perspective views of the rear portion of the exemplary seed tender shown in FIGS. 5A and 5B, respectively.

DETAILED DESCRIPTION OF EXEMPLARY EMBODIMENTS

Figure 1:
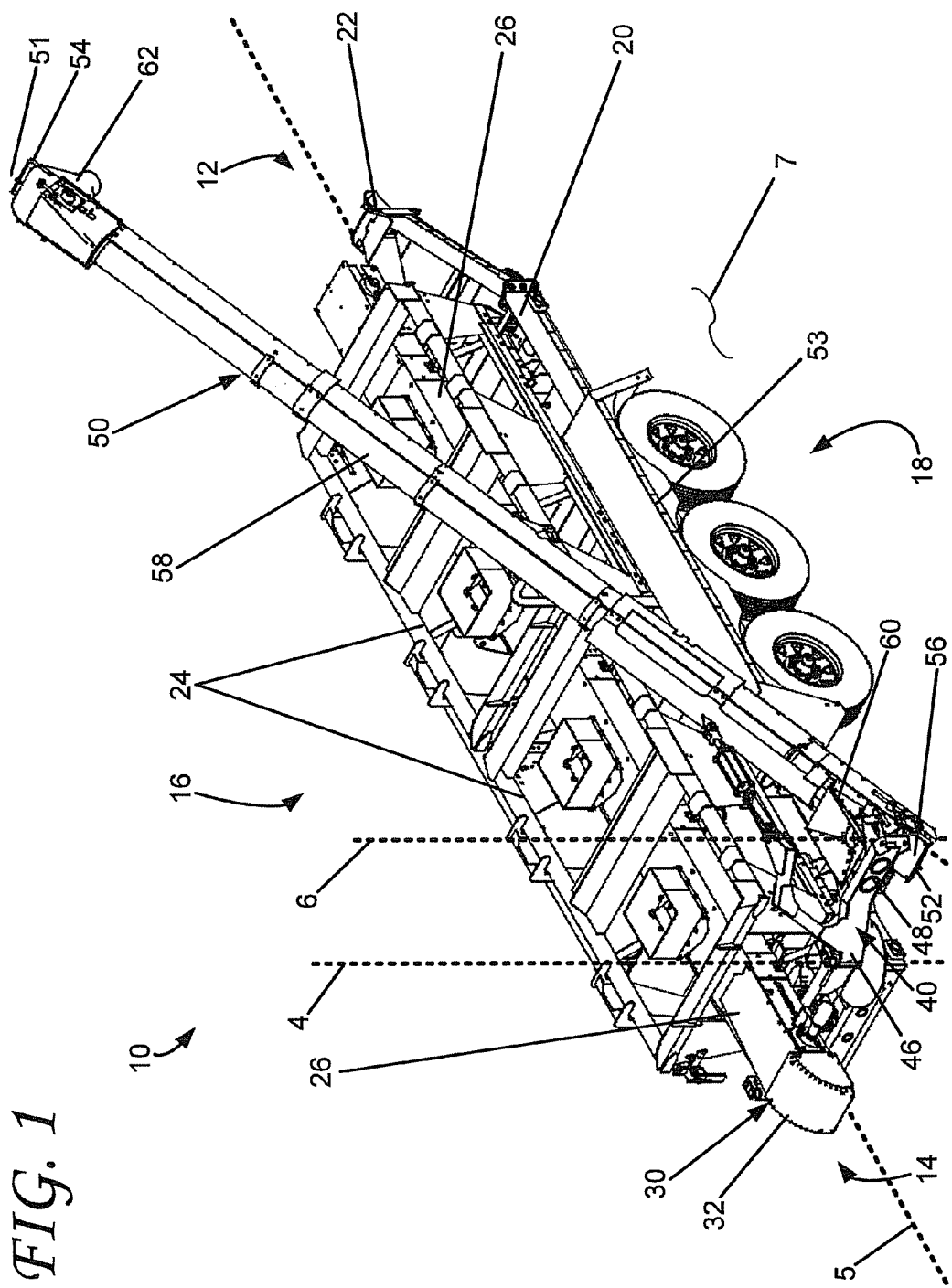
FIG. 1 is a perspective view of an exemplary seed tender configured in a stowed configuration.

In the following detailed description of illustrative embodiments, reference is made to the accompanying figures of the drawing which form a part hereof, and in which are shown, by way of illustration, specific embodiments which may be practiced. It is to be understood that other embodiments may be utilized and structural changes may be made without departing from (e.g., still falling within) the scope of the disclosure presented hereby.

Exemplary apparatus shall be described with reference to FIGS. 1-7. It will be apparent to one skilled in the art that elements from one embodiment may be used in combination with elements of the other embodiments, and that the possible embodiments of such apparatus using combinations of features set forth herein is not limited to the specific embodiments shown in the figures and/or described herein. Further, it will be recognized that the embodiments described herein may include many elements that are not necessarily shown to scale. Still further, it will be recognized that the size and shape of various elements herein may be modified but still fall within the scope of the present disclosure, although certain one or more shapes and/or sizes, or types of elements, may be advantageous over others.

Multiple views of an exemplary seed tender 10 are depicted in FIGS. 1-7. Generally, the seed tender 10 is configured to hold one or more seed containers 2 (see, e.g., FIG. 2), which may contain seed, and to distribute seed from at least one of the seed containers 2 (e.g., distribute seed from one container or more than one container simultaneously) using an inclined conveyor apparatus 50. Although the exemplary seed tender 10 is depicted holding seed containers 2, the seed tender 10 itself and/or one or more structures or apparatus of the seed tender 10 may be repurposed or reconfigured to receive, hold, and/or distribute various bulk material. "Bulk material" may include any material that may be transported and/or stored in bulk, e.g., seed, fertilizer, grain, cement, raw material, liquid, etc.

Figure 2A:
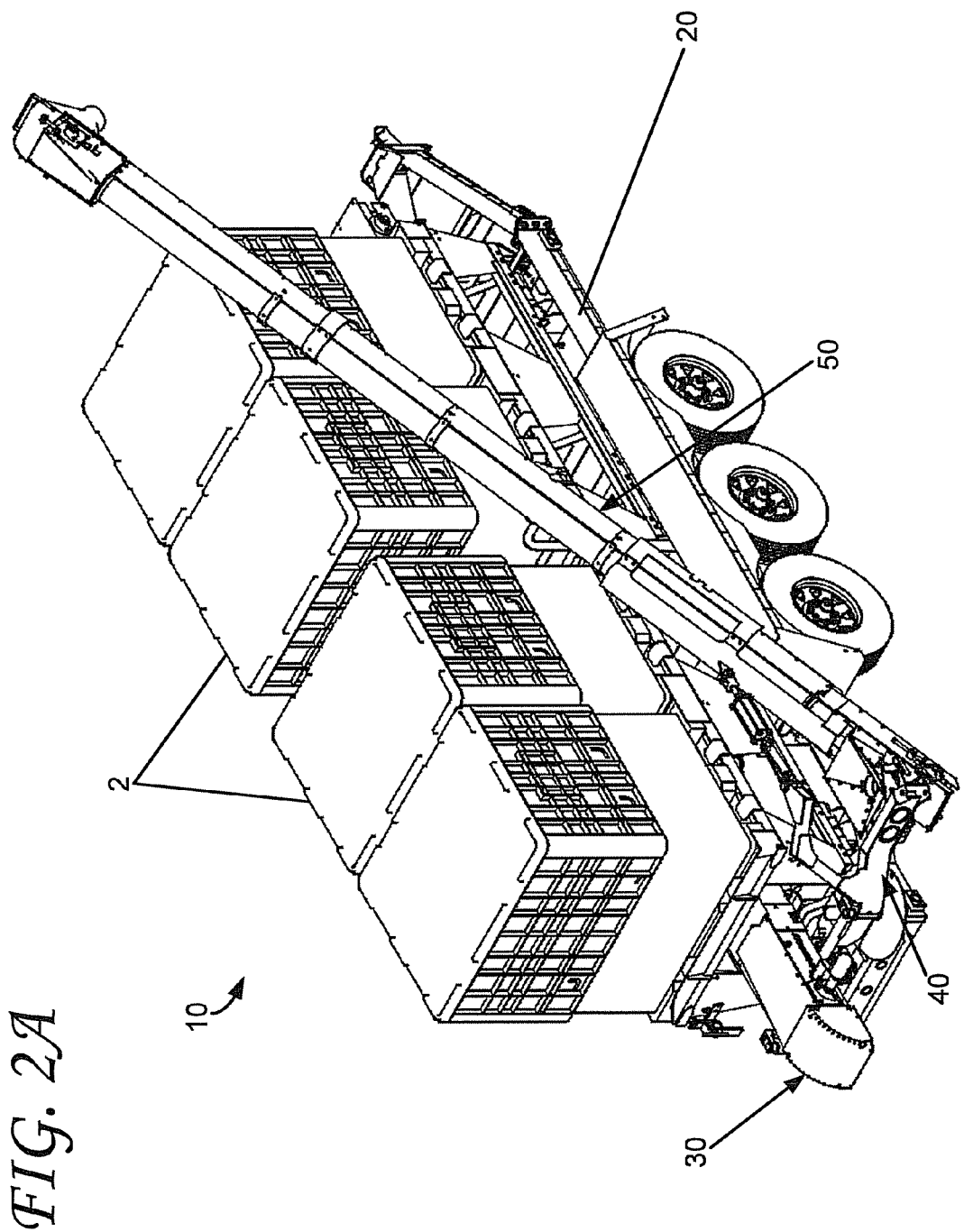
FIG. 2A is a perspective view of the exemplary seed tender of FIG. 1 holding seed containers and including inclined conveyor apparatus configured in a stowed configuration.
Figure 2B:
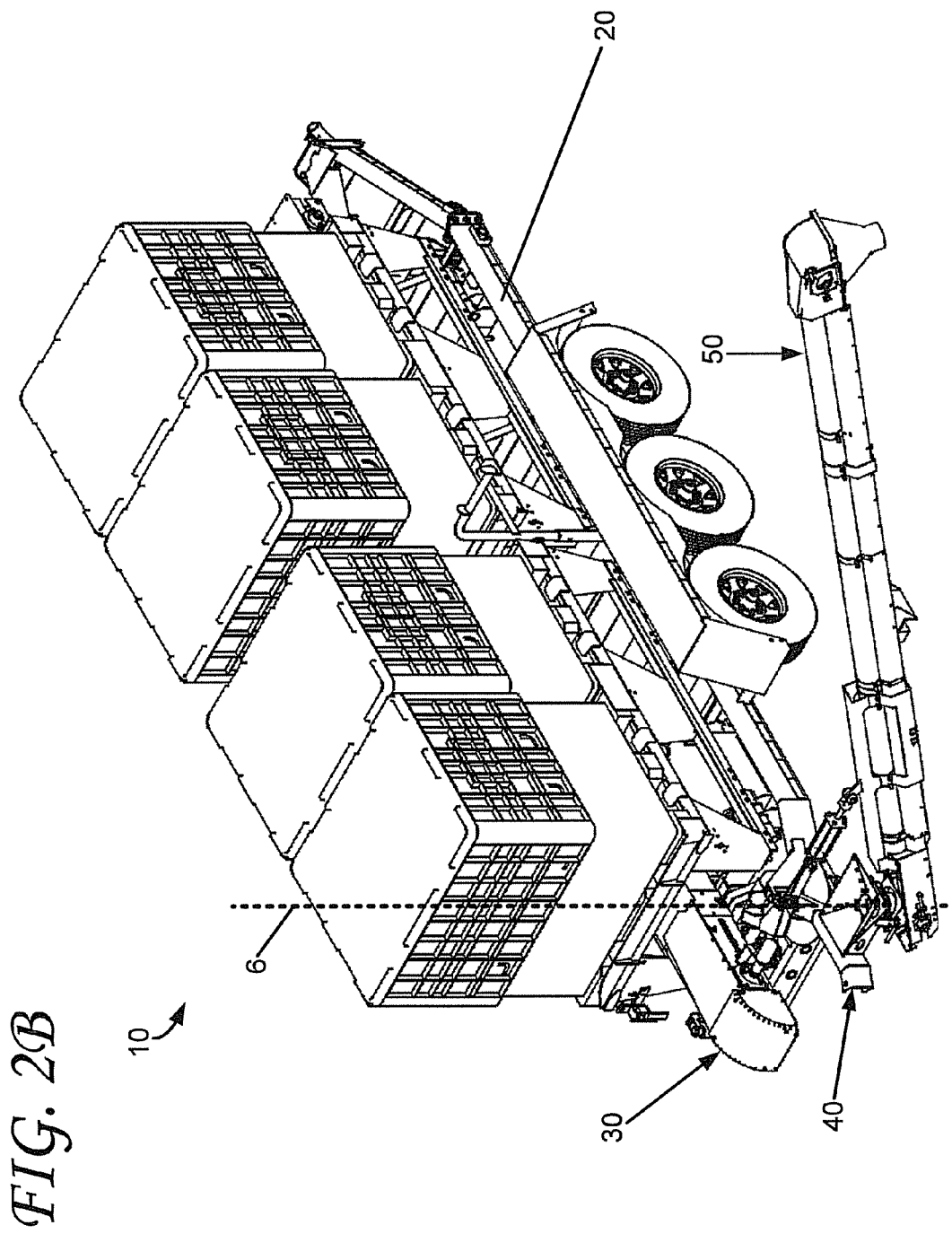
FIG. 2B is a perspective view of the exemplary seed tender of FIG. 2A including the inclined conveyor apparatus configured about halfway between a stowed configuration and a discharge configuration.
Figure 2D:
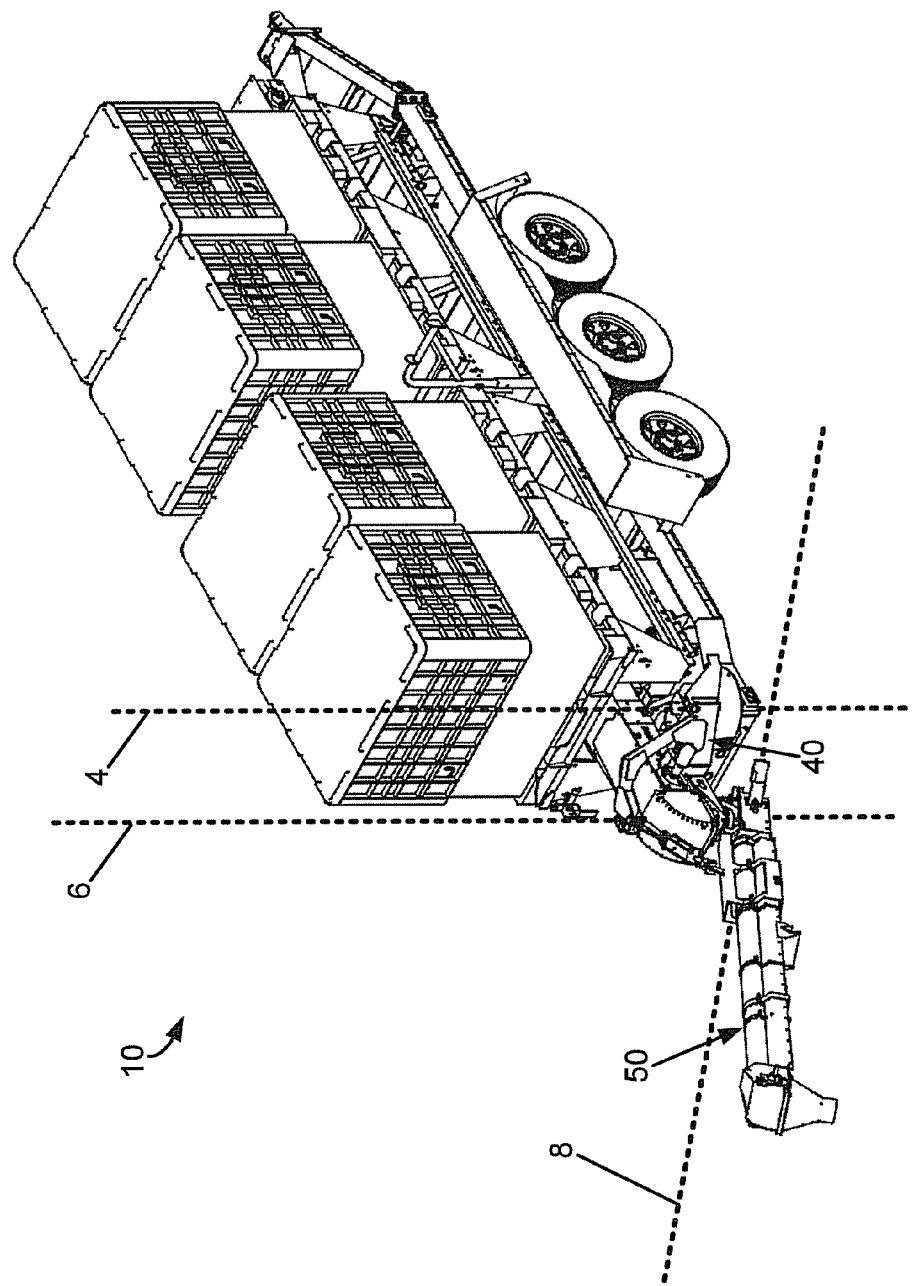
FIG. 2D is a perspective view of the exemplary seed tender of FIG. 2C with the inclined conveyor apparatus pivotally moved when in the discharge configuration.
Figure 2E:
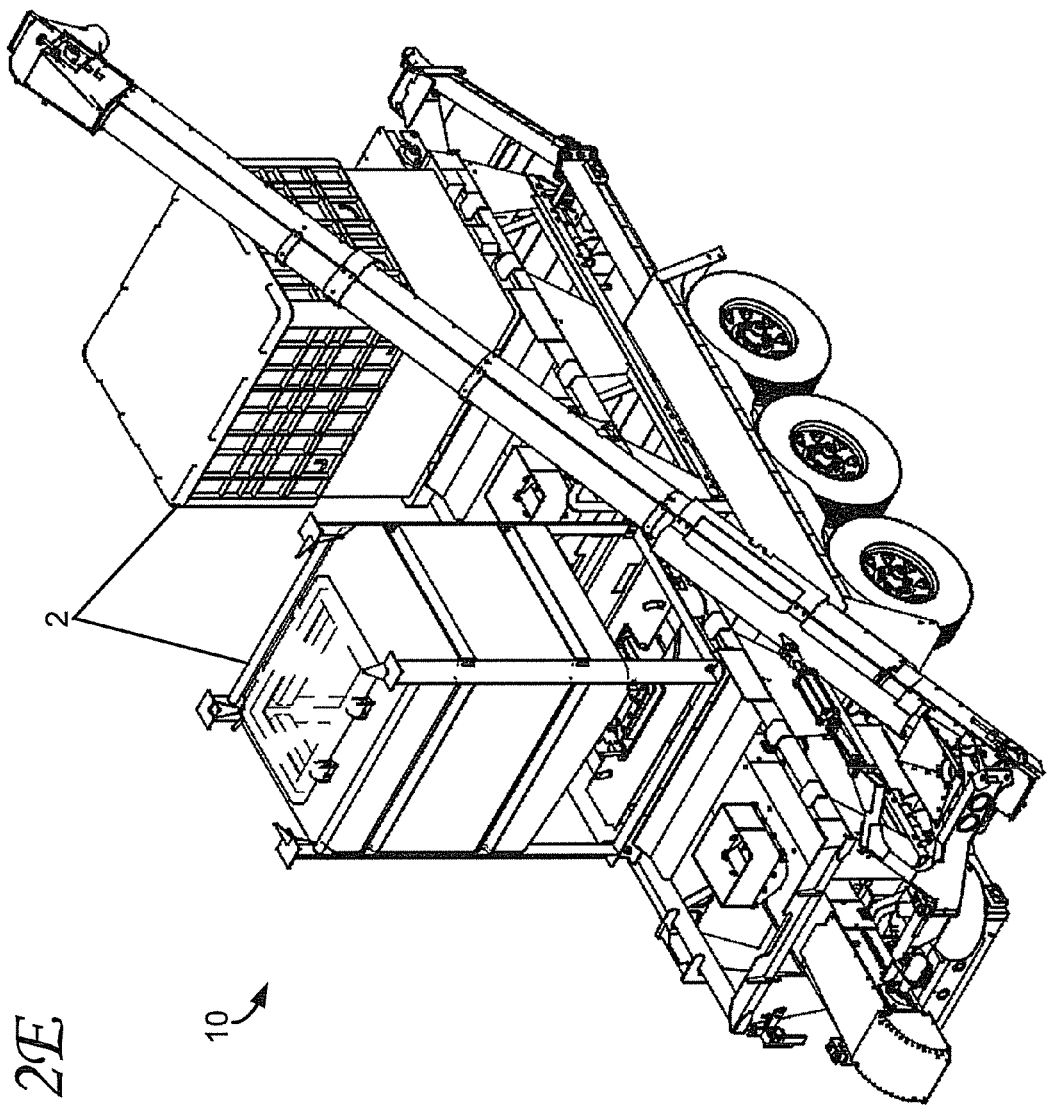
FIG. 2E is a perspective view of the exemplary seed tender of FIG. 2A holding different types of seed containers.

Further, although the seed tender 10 shown in FIG. 2A is holding four generic, similar seed boxes, the seed tender 10 may be configured to hold different types of seed containers and more than one different type of seed container simultaneously (as shown in FIG. 2E). For example, the seed tender 10 may be configured to hold one or more of the following seed containers: SeedMobile SM80 and/or SM100 containers by Willmar Fabrication, LLC; ProBox containers by Pioneer Hi-Bred International, Inc.; and Seed Boxes by Buckhorn, Inc.

Generally, the seed containers 2 hold bulk seed and discharge the seed through one or more openings located in the bottom of the containers 2. The seed tender 10 is operable to move the seed discharged from the openings of the containers 2 into other agricultural equipment.

For reference, the exemplary send tender 10 may define a front side 12, a rear side 14, a left side 16, and a right side 18. The front side 12 may correspond to the side of the seed tender 10 that may include hitch apparatus 22 (e.g., a receiver for a hitch ball) that may be used to couple or hitch the seed tender 10 to the hitch of a towing vehicle, e.g., tractor, truck, etc. Further, the front side 12 may correspond to the forward direction of movement when being towed by a vehicle in a forward direction.

As depicted, the exemplary seed tender 10 may include a frame 20 that extends from the front side 12 to the rear side 14 along a frame axis 5. As described, hitch apparatus 22 may be located proximate the front side 12 of the seed tender 10, and as shown, may be coupled to (e.g., welded to, part of, etc.) the frame 20. The exemplary seed tender 10 may further include one or more wheels and axles coupled to the underside of the frame 20 configured to support the frame 20 and the one or more containers 2 above a ground surface 7 and operable to permit the towing of the seed tender 10.

The frame 20 may be formed of any material capable of maintaining structural functionality and operable to perform the one or more functions and/or operations described herein. For example, the frame 20 may be formed of steel, aluminum, wood, etc.

The exemplary seed tender 10 may further include seed container holding apparatus 24 and horizontal conveyor apparatus 26 located underneath the seed container holding apparatus 24. The seed container holding apparatus 24 may be coupled to the frame 20 and configured to hold the one or more seed containers 2. The seed container holding apparatus 24 may hold or secure the one or more seed containers 2 such that the seed contained within the seed containers 2 may be discharged via the openings located in the bottoms of the seed containers 2 to the horizontal conveyor apparatus 26. Further, for example, the seed container holding apparatus 24 may be configured to hold a seed container that includes two or more openings (e.g., a dual container) that correspond to two or more openings in the seed container holding apparatus 24 to discharge seed to the horizontal conveyor apparatus 26.

The horizontal conveyor apparatus 26 may be coupled to the frame 20 and configured to move the seed discharged from the seed containers 2 to the rear side 14 of the seed tender 10. Although the exemplary seed tender 10 utilizes horizontal conveyor apparatus 26 to move seed towards the rear side 14, the seed tender 10 may use any apparatus capable of moving seed, e.g., horizontally, along a distance such as, e.g., an auger, etc.

Discharge apparatus 30 may be located proximate the rear side 14 of the seed tender 10. The discharge apparatus 30 may be configured to receive the seed from the horizontal conveyor apparatus 26 and to discharge, or deliver, the seed 10 to the inclined conveyor apparatus 50. As shown, the discharge apparatus 30 may include a downward-bending chute 32 that directs the seed in a downward direction (e.g., towards the ground surface 7) to the inclined conveyor apparatus 50.

Generally, the inclined conveyor apparatus 50 may be operable to move seed from the seed tender 10 to agricultural equipment. The inclined conveyor apparatus 50 may move seed to the agricultural equipment by "conveying" the seed along a conveyor belt at an upward incline such that the seed may be discharged above a seed receptacle of the agricultural equipment. Although the exemplary seed tender 10 utilizes an inclined conveyor apparatus 50 to move the seed into agricultural equipment, the seed tender 10 may use any apparatus capable of moving seed along a distance such as, e.g., an auger, etc.

The inclined conveyor apparatus 50 may extend from a proximal end 52 to a distal end 54 along a conveyor axis 51. As shown, the proximal end 52 is the end located closer the ground surface 7 when the seed tender 10 is resting on a ground surface 7 and the distal end 54 is the end further away from the ground surface 7. In other words, the proximal end 52 has a lower elevation than the distal end 54. The inclined conveyor apparatus 50 may be configured to receive seed, e.g., via the discharge apparatus 30, proximate the proximal end 52. As shown, the seed tender 10 may further include a funnel or receptacle 60 proximate the proximal end 52 of the inclined conveyor apparatus 50 to assist in the reception of seed from the discharge apparatus 30 (e.g., to direct the seed into the inclined conveyor apparatus 50).

The inclined conveyor apparatus 50 may be configured to move the received seed from, or proximate, the proximal end 52 to, or proximate, the distal end 54 and to discharge the seed proximate the distal end 54. As shown, the inclined conveyor apparatus 50 includes a chute 62 located proximate the distal end 54 to assist in directing the discharge of seed from the inclined conveyor apparatus 50 into agricultural equipment.

The inclined conveyor apparatus 50 may be configured into (e.g., between) at least two configurations. First, as shown in FIGS. 2A, 3A, 4A, 5A, 6A, & 7A, the inclined conveyor apparatus 50 may be configured in a stowed configuration. The stowed configuration may provide a compact arrangement for the inclined conveyor apparatus 50 with respect to the remainder of the seed tender 10 and may be used when transporting (e.g., to conform to road width requirements or standards) and/or storing the send tender 10 (e.g., to save space).

Generally, when in the stowed configuration, the inclined conveyor apparatus 50 is "folded" from the rear side 14 towards the front side 12 of the seed tender 10 such that the inclined conveyor apparatus 50 is aligned along the right side 18 of the seed tender 10 (e.g., within a plane defined by the right side 18 and orthogonal to the ground surface 7). In other words, each of the distal end 54 and the proximal end 52 of the inclined conveyor apparatus 50 may be both located proximate a plane (e.g., a plane orthogonal to the ground surface 7) defined by the right side 18 of the seed tender 10 when in the stowed configuration.

The stowed configuration may be described in terms of the conveyor axis 51 and a perimeter of the seed tender 10. For example, the conveyor axis 51 may be located in a plane (e.g., a plane orthogonal to the ground surface 7) defined by the right side 18 of the seed tender 10 when in the stowed configuration. Further, for example, the front, rear, left, and right sides, 12, 14, 16, 18, of the seed tender 10 may define a perimeter (e.g., the perimeter being orthogonal to the ground surface 7), and the inclined conveyor apparatus may lie within the perimeter of the seed tender 10 when in the stowed configuration (e.g., the conveyor axis 51 may lie within a side of the perimeter defined by an outer surface of the wheel well or fender 53 as shown in FIG. 1).

Second, as shown in FIGS. 2C, 3C, 4C, 5B, 6B, & 7C, the inclined conveyor apparatus 50 may be configured in a discharge configuration. Generally, when in the discharge configuration, the inclined conveyor apparatus 50 is "unfolded" such that it extends outwardly from the remainder of the seed tender 10. In other words, the proximal end 52 of the inclined conveyor apparatus 50 may be located proximate the discharge apparatus 30 to receive seed from the discharge apparatus 30 and the distal end 54 may be located away from the frame 20 when in the discharge configuration.

Similar to the stowed configuration, the discharge configuration may be described in terms of the perimeter of the seed tender 10. For example, at least a portion of the inclined conveyor apparatus 50 may be located outside the perimeter of the seed tender 10 when in the discharge configuration.

Figure 4A:
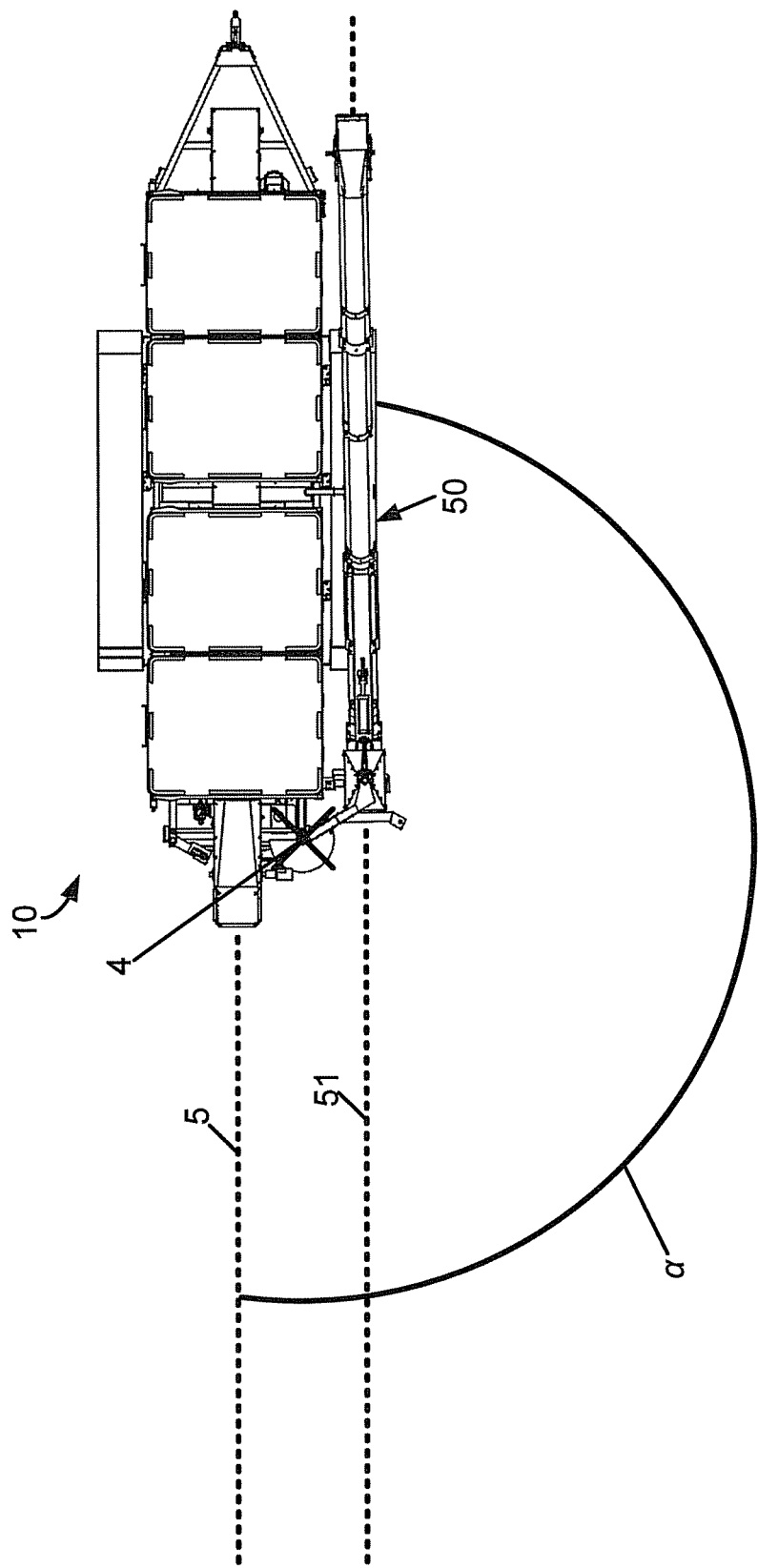
Figure 4C:
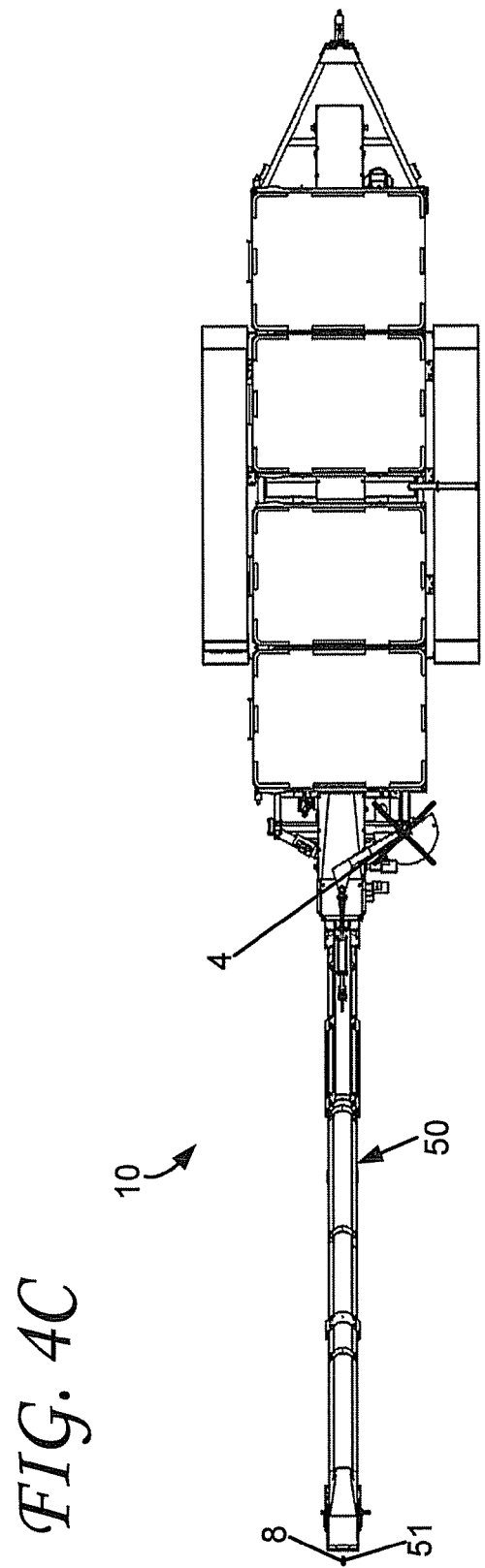
Figure 5A:
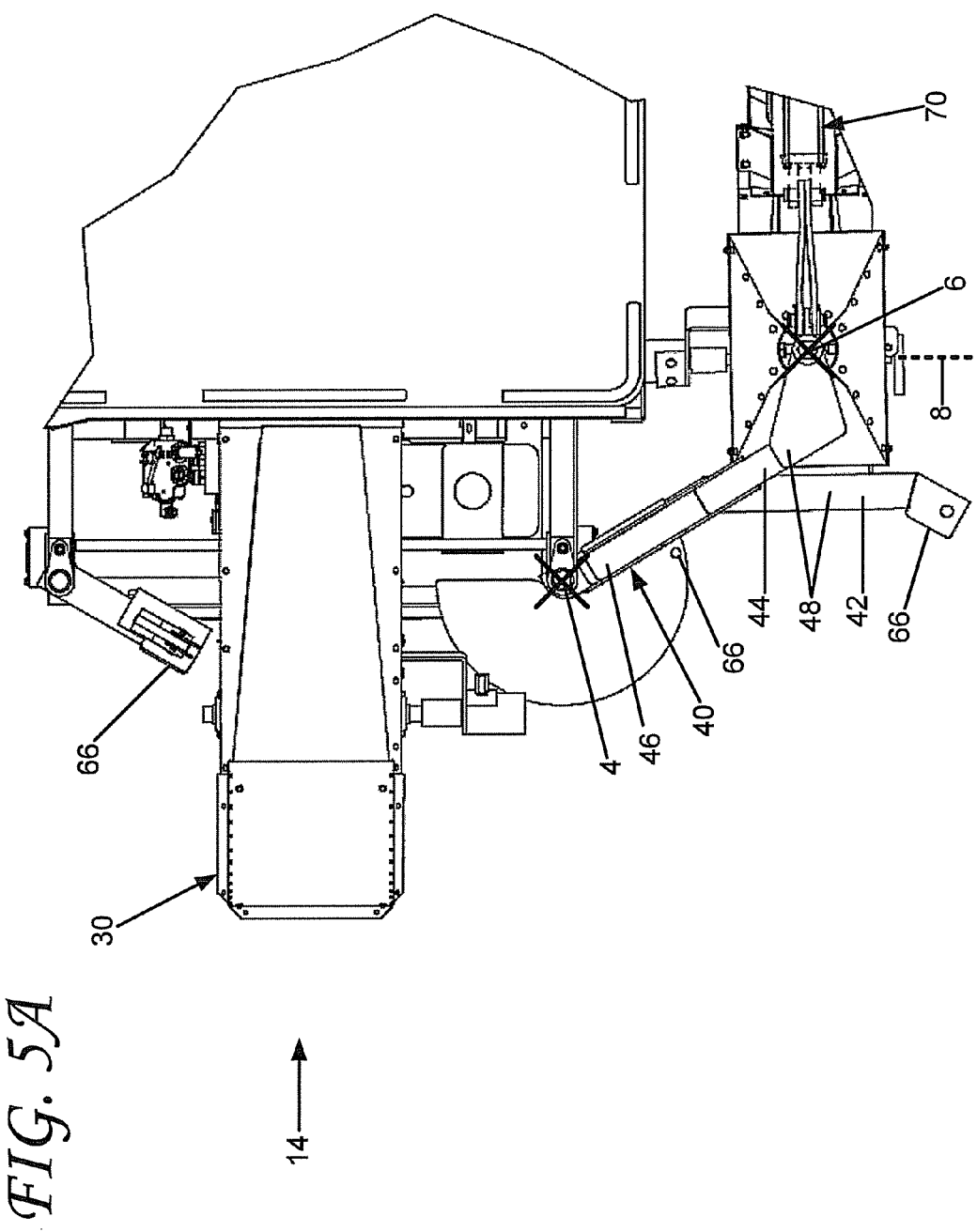
FIGS. 5A and 5B are close-up, top views of a rear portion of the exemplary seed tender of FIGS. 4A and 4C, respectively.
Figure 5B:
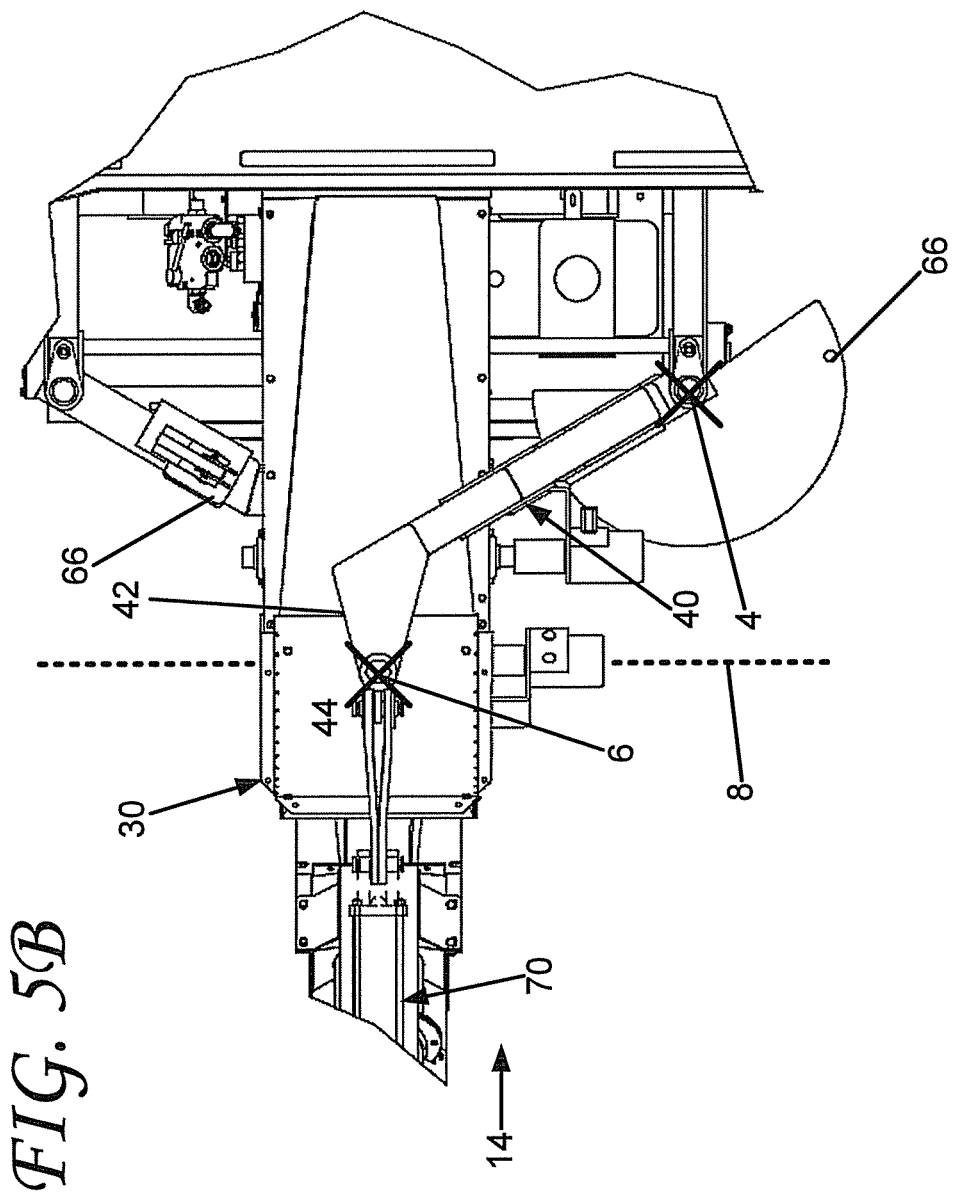
Figure 7A:
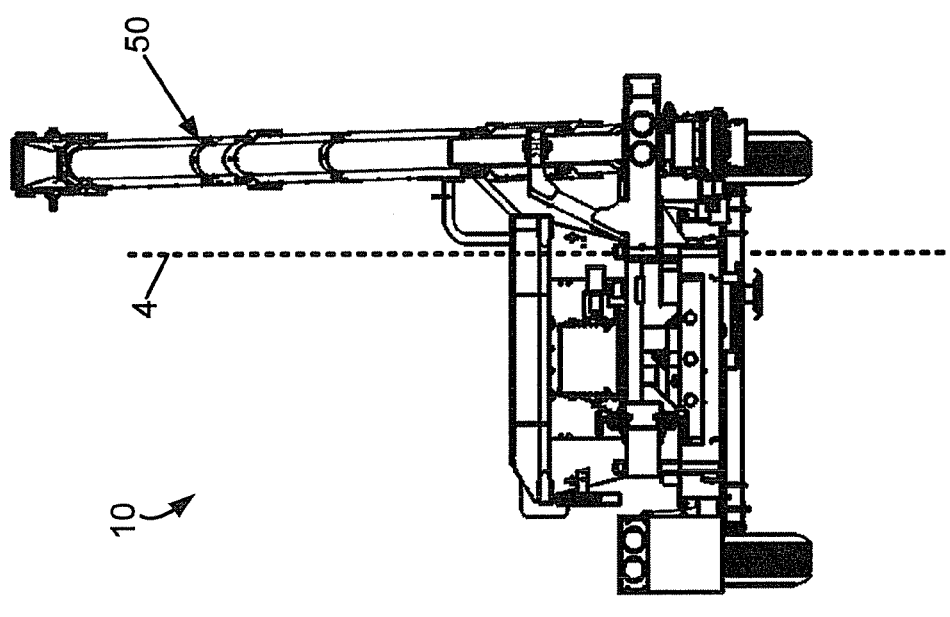
FIGS. 7A, 7B, and 7C are rear side views of the exemplary seed tender of FIGS. 2A, 2B, and 2C, respectively.
Figure 7B:
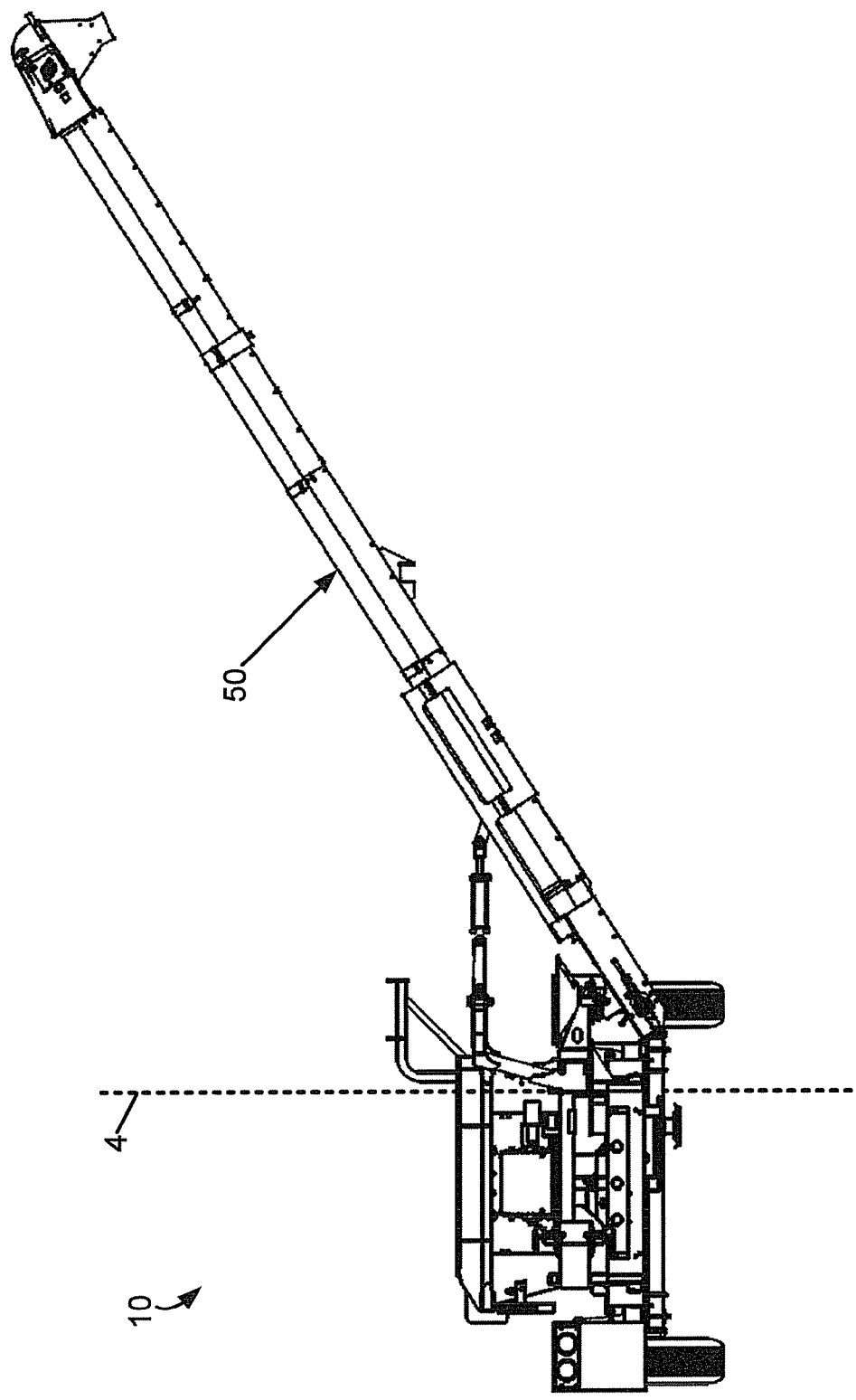
Figure 7C:
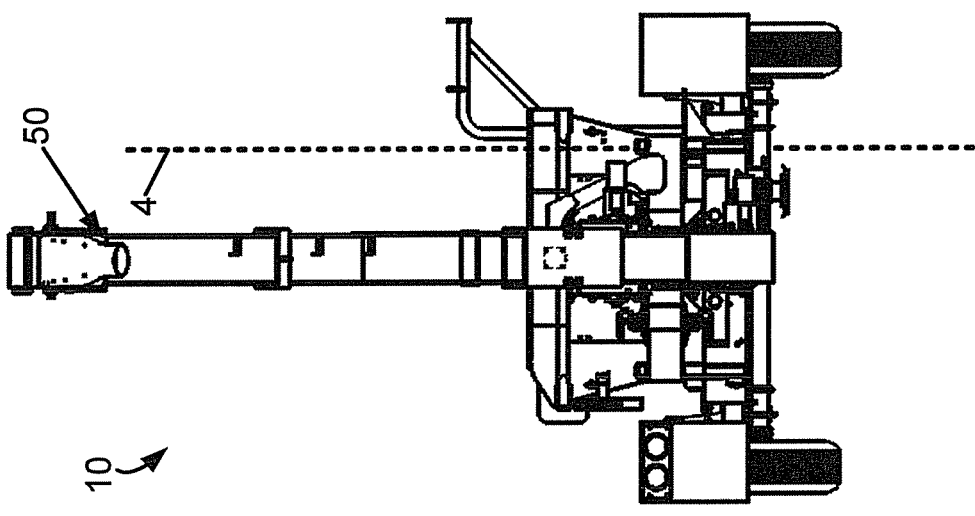

The movements between the stowed configuration and the discharge configuration may be facilitated by a pivotal coupling. For example, as shown, the inclined conveyor apparatus 50 is pivotally coupled to the frame 20 about a first pivot axis 4, which may be perpendicular to the ground surface 7 and/or the frame axis 5. The inclined conveyor apparatus 50 may pivotally move (as shown in FIGS. 4A & 4B) about the first pivot axis 4 from the stowed configuration (e.g., as shown in FIGS. 2A, 3A, 4A, 5A, 6A, & 7A), to a position between the stowed and discharge configurations (e.g., as shown in FIGS. 2B, 3B, 4B, & 7B), and finally, to the discharge configuration (e.g., as shown in FIGS. 2C, 3C, 4C, 5B, 6B, & 7C).

The inclined conveyor apparatus 50 may be pivotally movable about 180 degrees about the first pivot axis 4 from the stowed configuration to the discharge configuration. The pivotal motion of the inclined conveyor apparatus 50 about the first pivot axis 4 may be described in terms of an angle formed between the frame axis 5 and the inclined conveyor apparatus 50. For example, the inclined conveyor apparatus 50 and the frame axis 5 may form angle alpha as shown in FIGS. 4A-4B. The inclined conveyor apparatus 50 may be pivotally movable about first pivot axis 4 such that angle alpha may be anywhere between, and including, about 120 degrees and about 240 degrees (e.g., about 140 degrees, about 160 degrees, about 175 degrees, about 190 degrees, about 210 degrees, about 230 degrees, etc.). For example, angle alpha is about 90 degrees in FIG. 4B, and angle alpha is about 0 degrees in FIG. 4C.

Further, as shown, the first pivot axis 4 may be located closer to the right side 18 of the seed tender 10 than the left side 16. Although the exemplary seed tender 10 has a first pivot axis 4 closer to the right side 18 than the left side 16 of the seed tender 10, the seed tender 10 may be configured in the opposite manner such that the first pivot axis 4 is closer to the left side 16 than the right side 18 such that the inclined conveyor apparatus 50 may be pivotally movable about the first pivot axis 4 into a stowed configuration proximate a plane defined by the left side 16 (e.g., a plane orthogonal to the ground surface 7). Also, as shown in the exemplary embodiment, the first pivot axis 4 is proximate the rear side 14 of the seed tender 10 but the seed tender 10 may be configured such that the first pivot axis 4 is proximate the front side 12. In essence, the locations of the pivotal coupling and first pivot axis 4 between the inclined conveyor apparatus 50 and the frame 20 may be located anywhere within the seed tender 10 so as to provide the stowed and discharge configurations as described herein.

The seed tender 10 may further include locking apparatus 66 (e.g., see FIGS. 5A-5B & 6A-6B) configured to hold the inclined conveyor apparatus 50 in one of the stowed configuration and the discharge configuration. The locking apparatus 66 may include one or more pins (e.g., spring loaded pins) that are positionable within an aperture in the frame 20 and an aperture in the inclined conveyor apparatus 50 (or pivot member 40 as described below) to hold, or lock, the inclined conveyor apparatus 50 in one of the stowed configuration and the discharge configuration.

The inclined conveyor apparatus 50 may also be pivotally movable or adjustable with respect to the remainder of the seed tender 10 when in the discharge configuration to move at least a part of the inclined conveyor apparatus 50 over agricultural equipment located proximate the seed tender 10 for discharging, or unloading, seed from the seed tender 10 into the other agricultural equipment. For example, as shown, the inclined conveyor apparatus 50 may be pivotally moveable about a second pivot axis 6, which is parallel to the first pivot axis 4, when in the discharge position.

The pivotal motion of the inclined conveyor apparatus 50 about second pivot axis 6 may be described in terms of an angle formed between the inclined conveyor apparatus 50 and the frame axis 5. For example, the conveyor axis 51 and the frame axis 5 may form angle beta as shown in FIG. 4D. The inclined conveyor apparatus 50 may be pivotally movable about second pivot axis 6 such that angle beta may be anywhere between, and including, about 10 degrees and about 105 degrees (e.g., about 20 degrees, about 30 degrees, about 45 degrees, about 55 degrees, about 65 degrees, about 80 degrees, about 90 degrees, about 100 degrees, about 120 degrees, about 135 degrees, about 155 degrees, etc.). For example, as shown in FIG. 4D, angle beta is about 20 degrees.

Further, the inclined conveyor apparatus 50 may be pivotally movable either clockwise or counterclockwise from the frame axis 5. As such, if angle beta is 20 degrees, the inclined conveyor apparatus 50 may be pivotally movable about 40 degrees (e.g., 20 degrees in either direction from the frame axis 5). In at least one embodiment, angle beta may be less than or equal to about the 105 degrees in either direction. In other words, the inclined conveyor apparatus 50 may be pivotally moveable about 210 degrees about the second pivot axis 6.

Further, the second pivot axis 6 may not extend through the same location as first pivot axis 4. Instead, the second pivot axis 6 may be described as being offset from the first pivot axis 4. The inclined conveyor apparatus 50 may also be held, or lockable, in a position about the second pivot axis 6 using locking apparatus similar to the locking apparatus 66 described herein but located proximate location 69.

Figure 3A:
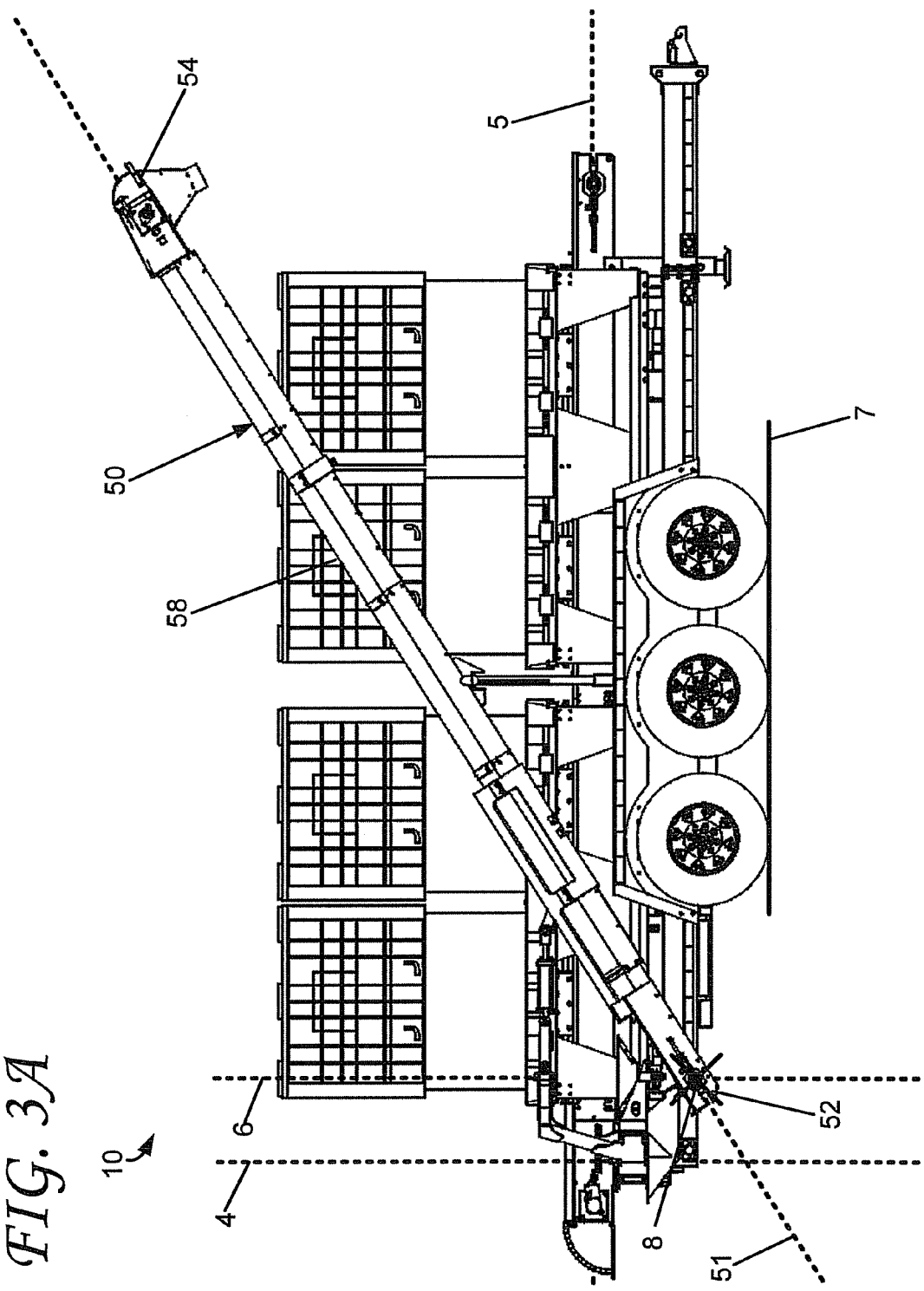
Figure 3D:
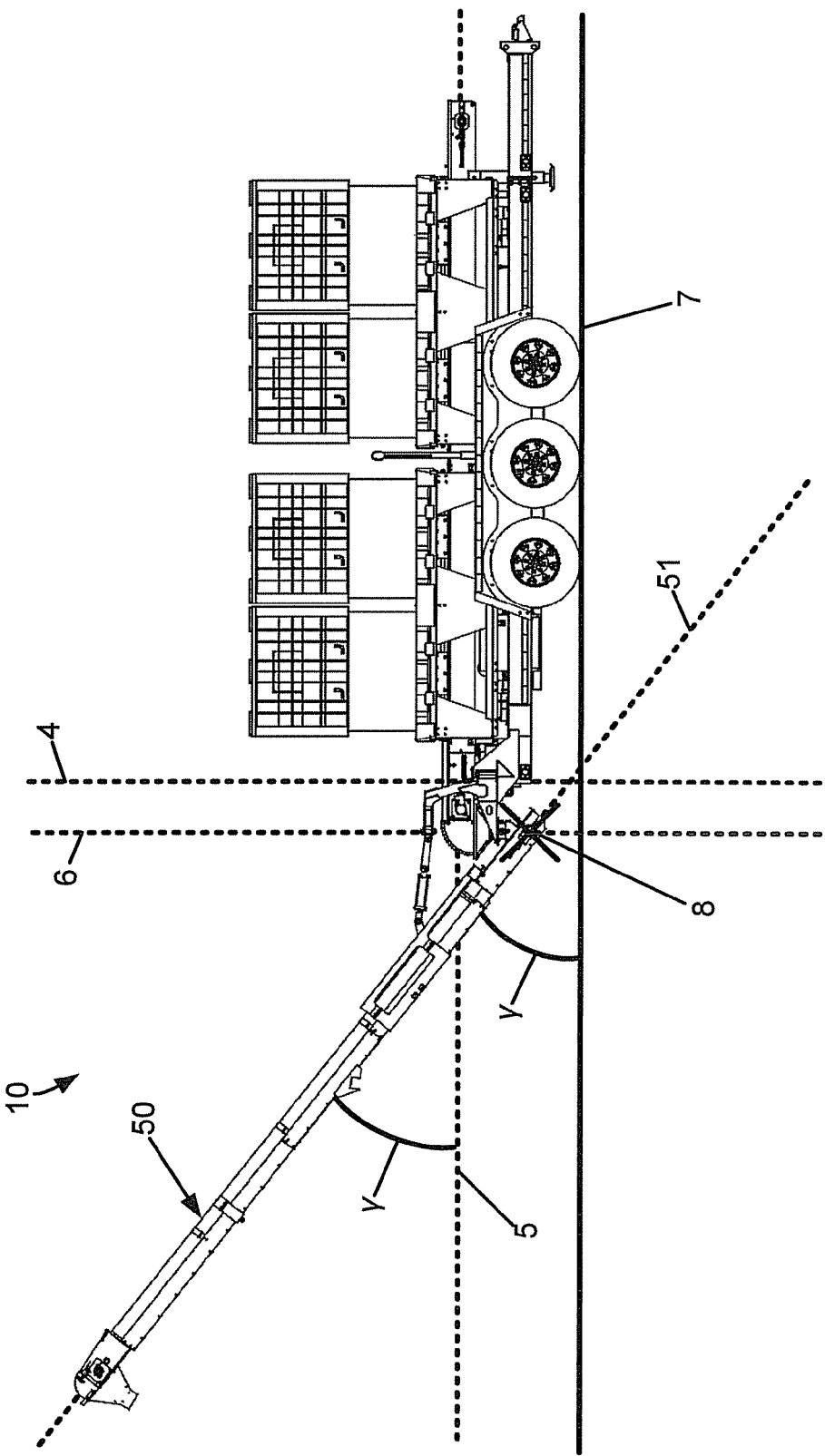
FIG. 3D is a right side view of the exemplary seed tender of FIG. 3C with a distal portion of inclined conveyor apparatus being raised.

At least a portion of the inclined conveyor apparatus 50 may also be pivotally movable, or tiltable, about a third pivot axis 8 that is perpendicular to the first pivot axis 4 and parallel to the ground surface 7, e.g., to adjust the height at which seed may be discharged from the inclined conveyor apparatus 50, as shown in FIGS. 3C-3D. For example, the inclined conveyor apparatus 50 may include a proximal portion 56 and a distal portion 58. The distal portion 58 may be pivotally coupled to the proximal portion 56 about the third pivot axis 8, and is pivotally movable about the third pivot axis 8 to raise and lower the distal end 54 of the inclined conveyor apparatus 50.

The pivotal motion of the distal portion 58 about the third pivot axis 8 may be described in terms of an angle formed between the distal portion 58 and the ground surface 7 and/or the frame axis 5. For example, the conveyor axis 51 and the ground surface 7 and/or frame axis 5 may form angle gamma as shown in FIGS. 3C-3D. The distal portion 58 may be pivotally movable about the third pivot axis 8 such that angle gamma may be anywhere between, and including, about 60 degrees and about 15 degrees (e.g., about 55 degrees, about 50 degrees, about 45 degrees, about 35 degrees, about 25 degrees, about 20 degrees, etc.). For example, as shown in FIG. 3C, angle gamma is about 35 degrees, and, as shown in FIG. 3D, angle gamma is about 40 degrees.

As previously described, the inclined conveyor apparatus 50 is pivotally coupled to the frame 20 about the first pivot axis 4. As used herein, two objects that are "pivotally coupled" may be defined as two objects that are connected to each other directly or through one or more additional structures and/or apparatus about a pivotal axis.

For example, as shown, the exemplary seed tender 10 includes a pivot member 40 that is pivotally coupled to the frame 20 proximate the rear side 14 of the seed tender 10 about the first pivot axis 4 and is also pivotally coupled to the inclined conveyor apparatus 50 proximate its proximal end 52 about the second pivot axis 6 (more detailed views of the pivot member 40 are shown in FIGS. 4A-5B). More specifically, the pivot member 40 may extend from a first end 46 to a second end 48, and the first end 46 of the pivot member 40 may be pivotally coupled to the frame 20 and the second send 48 of the pivot member may be pivotally coupled to the inclined conveyor apparatus 50.

As such, the inclined conveyor apparatus 50 may be described as being pivotally coupled to the frame 20 about the first pivot axis 4 even though, in the depicted embodiment, an additional member, i.e., the pivot member 40, is directly pivotally coupled to the frame 20 about the first pivot axis 4. Since in the depicted embodiment the pivot member 40 and the inclined conveyor apparatus 50 are pivotally coupled about the second pivot axis 6, both of the pivot member 40 and the inclined conveyor apparatus 50 pivotally move together between the stowed configuration and the discharge configuration about the first pivot axis 4. Further, since the inclined conveyor apparatus 50 and the pivot member 40 are pivotally coupled about the second pivot axis 6, the inclined conveyor apparatus 50 may pivotally move without moving with the pivot member 40 about the second pivot axis 6 when in the discharge configuration. In other words, the pivot member 40 may remain stationary when the inclined conveyor apparatus 50 moves about the second pivot axis 6.

The pivot member 40 may also be pivotally coupled to each of the proximal portion 56 and the distal portion 58 of the inclined conveyor apparatus 50 to, e.g., facilitate the pivoting, or tilting, relative to the ground surface 7 of the distal portion 58 about the third pivot axis 8. For example, as shown, the pivot member 40 may include a first portion 42 pivotally coupled to the proximal portion 56 of the inclined conveyor apparatus 50 and a second portion 44 pivotally coupled to the distal portion 58 of the inclined conveyor apparatus 50.

The dual coupling of the pivot member 40 to the inclined conveyor apparatus 50 may assist in the movement of the distal portion 58 of the inclined conveyor apparatus 50 about the third pivot axis 8. For example, the seed tender 10 may further include actuation apparatus 48 located between the second portion 44 of the pivot member 40 and the distal portion 58 of the inclined conveyor apparatus 50. The actuation apparatus 48, e.g., a hydraulic piston, may be extended or retracted thereby pushing or pulling the distal portion 58 about the third pivot axis 8 while the proximal portion 56 remains stationary due to its coupling to the first portion 42 of the pivot member 40. Although the actuation apparatus 48 as shown is a hydraulic piston, the actuation apparatus 48 may be any apparatus capable of moving the distal portion 58 of the inclined conveyor apparatus 50 about the third pivot axis 8.

All patents, patent documents, and references cited herein are incorporated in their entirety as if each were incorporated separately. This disclosure has been provided with reference to illustrative embodiments and is not meant to be construed in a limiting sense. As described previously, one skilled in the art will recognize that other various illustrative applications may use the techniques as described herein to take advantage of the beneficial characteristics of the exemplary apparatus described herein. Various modifications of the illustrative embodiments, as well as additional embodiments of the disclosure, will be apparent upon reference to this description.

What is claimed:

1. A seed tender defining a front side, a rear side, a left side, and a right side, wherein the tender comprises:
    a frame extending from the front side to the rear side of the tender along a frame axis, wherein the frame is configured to hold one or more seed containers;
    a discharge apparatus located proximate the rear side to receive seed from one or more seed containers and to discharge the seed;
    a pivot member pivotally coupled to the frame proximate the rear side of the tender about a first pivot axis; and
    an inclined conveyor apparatus extending from a proximal end to a distal end and configured to receive seed proximate the proximal end via the discharge apparatus, to move seed proximate the proximal end to proximate the distal end, and to discharge seed proximate the distal end, wherein the inclined conveyor apparatus is pivotally coupled to the pivot member proximate the proximal end of the inclined conveyor apparatus about a second pivot axis, wherein the second pivot axis is parallel to and independent from the first pivot axis,
    wherein the pivot member and the inclined conveyor apparatus are configured to pivotally move together about the first pivot axis between at least a stowed configuration and a discharge configuration,
    wherein the proximal end of the inclined conveyor apparatus is located proximate the discharge apparatus to receive seed from the discharge apparatus when in the discharge configuration, wherein the inclined conveyor apparatus is pivotally movable about the second pivot axis when in the discharge configuration, and
    wherein the inclined conveyor apparatus is adjacent a plane defined by one of the right side and the left side of the tender when in the stowed configuration.

2. The seed tender of claim 1, wherein the first pivot axis is closer to the right side than the left side of the tender, and wherein each of the distal end and the proximal end of the inclined conveyor apparatus are both located proximate a plane defined by the right side of the tender when in the stowed position.

3. The seed tender of claim 1, wherein the inclined conveyor apparatus extends from the proximal end to the distal end along a conveyor axis, and wherein the conveyor axis of the conveyor apparatus is proximate a plane defined by the one of the right side and the left side of the tender when in the stowed configuration.

4. The seed tender of claim 1, wherein the pivot member and the inclined conveyor apparatus are pivotally movable 180 degrees about the first pivot axis from the stowed configuration to the discharge configuration.

5. The seed tender of claim 1, wherein the inclined conveyor apparatus comprises a proximal portion and a distal portion pivotally coupled to the proximal portion about a third pivot axis, wherein the third pivot axis is perpendicular to the first pivot axis, wherein the distal portion is pivotally movable about the third pivot axis to at least raise and lower the distal end of the conveyor apparatus.

6. The seed tender of claim 5, wherein the distal portion of the inclined conveyor apparatus is configured to pivot about the third pivot axis such that a conveyor axis extending through the distal portion is pivotally movable 45 degrees relative to the frame axis.

7. The seed tender of claim 5, wherein the pivot member comprises:
    a first portion pivotally coupled to the proximal portion of the inclined conveyor apparatus, and
    a second portion pivotally coupled to the distal portion of the inclined conveyor apparatus,
    wherein the seed tender further comprises actuation apparatus coupled between the second portion of the pivot member and the distal portion of the inclined conveyor apparatus, wherein the actuation apparatus is configured to pivot the distal portion of the inclined conveyor apparatus about the third pivot axis.

8. The seed tender of claim 1, further comprising a horizontal conveyor apparatus configured to move the seed from the one or more containers to the discharge apparatus.

9. The seed tender of claim 1, further comprising locking apparatus configured to lock the inclined conveyor apparatus and the pivot member in the discharge configuration.

10. The seed tender of claim 1, wherein the pivot member extends from a first end to a second end, and wherein the first end of the pivot member is pivotally coupled to the frame and the second end of the pivot member is pivotally coupled to the inclined conveyor apparatus.

11. A seed tender defining a from side, a rear side, a left side, and a right side, wherein the tender comprises:
   a frame extending from the front side to the rear side of the tender along a frame axis, wherein the frame is configured to hold one or more seed containers,
   a discharge apparatus located proximate the rear side of the frame, wherein the discharge apparatus is configured to move seed from one or more seed containers and to discharge the seed; and
   an inclined conveyor apparatus extending from a proximal end to a distal end along a conveyor axis and configured to receive seed proximate the proximal end via the discharge apparatus, to move seed proximate the proximal end to proximate the distal end, and to discharge seed proximate the distal end, wherein the inclined conveyor apparatus is pivotally coupled to the frame proximate the proximal end of the inclined conveyor apparatus about a first pivot axis,
   wherein the inclined conveyor apparatus is configured to pivotally move about the first pivot axis between at least a stowed configuration and a discharge configuration,
   wherein the proximal end of the inclined conveyor apparatus is located proximate the discharge apparatus to receive seed from the discharge apparatus when in the discharge configuration, wherein the inclined conveyor apparatus is pivotally movable about a second pivot axis when in the discharge configuration, wherein the second pivot axis is parallel to and independent from the first pivot axis,
   wherein each of the distal end and the proximal end of the inclined conveyor apparatus are both located proximate a plane defined by one of the right side and the left side of the tender when in the stowed configuration.

12. The seed tender of claim 11, wherein the first pivot axis is closer to the right side than the left side of the tender, and wherein each of the distal end and the proximal end of the inclined conveyor apparatus are both located proximate a plane defined by the right side of the tender when in the stowed position.

13. The seed tender of claim 11, wherein the conveyor axis of the conveyor apparatus is parallel a plane defined by one of the right side and the left side of the tender when in the stowed configuration.

14. The seed tender of claim 11, wherein the inclined conveyor apparatus is pivotally movable 180 degrees about the first pivot axis from the stowed configuration to the discharge configuration.

15. The seed tender of claim 11, wherein the inclined conveyor apparatus comprises a proximal portion and a distal portion pivotally coupled to the proximal portion about a third pivot axis, wherein the third pivot axis is perpendicular to the first pivot axis, wherein the distal portion is pivotal movable about the third pivot axis to at least raise and lower the distal end of the conveyor apparatus.

16. The seed tender of claim 15, wherein the distal portion of the inclined conveyor apparatus is configured to pivot about the third pivot axis such that the conveyor axis extending through the distal portion is pivotally movable 45 degrees relative to the frame axis.

17. The seed tender of claim 15, wherein the proximal portion and the distal portion of the inclined conveyor apparatus are each individually pivotally coupled to the frame.

18. The seed tender of claim 15, further comprising actuation apparatus coupled to the distal portion of the inclined conveyor apparatus and configured to pivot the distal portion of the inclined conveyor apparatus about the third pivot axis.

19. The seed tender of claim 11, further comprising a horizontal conveyor apparatus configured to move the seed from the one or more containers to the discharge apparatus.

20. The seed tender of claim 11, further comprising locking apparatus configured to lock the inclined conveyor apparatus in the discharge configuration.

* * * * *

UNITED STATES PATENT AND TRADEMARK OFFICE
CERTIFICATE OF CORRECTION

| | |
|---|---|
| PATENT NO. | : 8,696,296 B2 |
| APPLICATION NO. | : 13/097974 |
| DATED | : April 15, 2014 |
| INVENTOR(S) | : Claussen et al. |

It is certified that error appears in the above-identified patent and that said Letters Patent is hereby corrected as shown below:

In the Claims

Column 11, line 4
In Claim 11:
delete "from" and insert --front--

Signed and Sealed this
Twenty-second Day of July, 2014

Michelle K. Lee
*Deputy Director of the United States Patent and Trademark Office*